United States Patent
Wilka et al.

(10) Patent No.: US 10,693,120 B2
(45) Date of Patent: Jun. 23, 2020

(54) ENERGY STORAGE DEVICE

(71) Applicant: LITHIUM ENERGY AND POWER GMBH & CO. KG, Stuttgart (DE)

(72) Inventors: Marcel Wilka, Lorch (DE); Naoto Takebayashi, Kyoto (JP)

(73) Assignee: Robert Bosch GmbH, Stuttgart (DE)

( * ) Notice: Subject to any disclaimer, the term of this patent is extended or adjusted under 35 U.S.C. 154(b) by 77 days.

(21) Appl. No.: 16/070,007

(22) PCT Filed: Jul. 26, 2016

(86) PCT No.: PCT/EP2016/067724
§ 371 (c)(1),
(2) Date: Jul. 13, 2018

(87) PCT Pub. No.: WO2017/121500
PCT Pub. Date: Jul. 20, 2017

(65) Prior Publication Data
US 2019/0036100 A1    Jan. 31, 2019

Related U.S. Application Data

(60) Provisional application No. PCT/EP2016/067724, filed on Jul. 26, 2016.

(30) Foreign Application Priority Data

Jan. 13, 2016  (JP) .................................. 2016-004558

(51) Int. Cl.
*H01M 2/22*        (2006.01)
*H01M 2/30*        (2006.01)
(Continued)

(52) U.S. Cl.
CPC .............. *H01M 2/30* (2013.01); *H01G 11/26* (2013.01); *H01G 11/74* (2013.01); *H01G 11/82* (2013.01);
(Continued)

(58) Field of Classification Search
CPC .......... H01M 2/22; H01M 2/30; H01M 2/266; H01M 10/0525; H01M 10/0585; H01G 11/26
(Continued)

(56) References Cited

U.S. PATENT DOCUMENTS 9,502,709 B2 * 11/2016 Kugino ................. H01M 2/266
2007/0105015 A1   5/2007 Munenaga et al.
(Continued)

FOREIGN PATENT DOCUMENTS

JP       S63116971 U    7/1988
JP       H0439855 A     2/1992
(Continued)

*Primary Examiner* — Amanda C. Walke
(74) *Attorney, Agent, or Firm* — Michael Best & Friedrich LLP

(57) ABSTRACT

Provided is an energy storage device which can easily fix plates of an electrode assembly to a container. An energy storage device (10) includes: an electrode assembly (500) formed by stacking plates; and a container (100) which accommodates the electrode assembly (500), wherein the container (100) includes: a body portion (200); and a conductive terminal portion (300) connected to the body portion (200), and the terminal portion (300) includes a first portion (310) and a second portion (320) which sandwich the plates therebetween.

16 Claims, 18 Drawing Sheets

(51) Int. Cl.
    *H01M 2/26* (2006.01)
    *H01G 11/26* (2013.01)
    *H01G 11/74* (2013.01)
    *H01G 11/82* (2013.01)
    *H01G 11/86* (2013.01)
    *H01M 10/0525* (2010.01)
    *H01M 10/0585* (2010.01)

(52) U.S. Cl.
    CPC .............. *H01G 11/86* (2013.01); *H01M 2/22* (2013.01); *H01M 2/266* (2013.01); *H01M 10/0525* (2013.01); *H01M 10/0585* (2013.01)

(58) Field of Classification Search
    USPC ......................................................... 429/178
    See application file for complete search history.

(56) References Cited

U.S. PATENT DOCUMENTS

2011/0244312 A1    10/2011  Tani et al.
2015/0188116 A1*  7/2015  Sato ..................... H01M 2/30
                                                          429/178

FOREIGN PATENT DOCUMENTS

| JP | H107169453 A | 7/1995 |
| JP | 2002134157 A | 5/2002 |
| JP | 2002279969 A | 9/2002 |
| JP | 2010108821 A | 5/2010 |
| JP | 2013093215 A | 5/2013 |
| WO | 2007086569 A1 | 8/2007 |

\* cited by examiner (a)

(b)

ENERGY STORAGE DEVICE

TECHNICAL FIELD

The present invention relates to an energy storage device equipped with an electrode assembly and a container.

BACKGROUND ART

Conventionally, there has been widely known an energy storage device which includes: an electrode assembly formed by stacking plates; and a container which accommodates the electrode assembly (see patent literature 1, for example).

PRIOR ART DOCUMENT

Patent Document

Patent Literature 1: JP-A-2010-108821

SUMMARY OF THE INVENTION

Problem to be Solved by the Invention

In the above-mentioned conventional energy storage device, the current collection is performed by bringing plates of an electrode assembly into contact with inner surfaces of a container which functions as current collector plates. However, there is a drawback that when the plates are not surely fixed to the container, there is a possibility of the occurrence of a drawback that performance of the energy storage device is lowered due to the increase of resistance caused by a contact failure between the plate and the container or the like.

The present invention has been made in view of the above-mentioned drawbacks, and it is an object of the present invention to provide an energy storage device where lowering of performance of the energy storage device can be suppressed by facilitating the fixing of plates of an electrode assembly to a container.

Means for Solving the Problem

To achieve the above-mentioned object, according to an aspect of the present invention, there is provided an energy storage device including an electrode assembly formed by stacking plates and a container which accommodates the electrode assembly, wherein the container includes a body portion and a conductive terminal portion connected to the body portion, and the terminal portion includes a first portion and a second portion which sandwich the plates therebetween.

In this manner, in the energy storage device, the terminal portion of the container includes the first portion and the second portion which sandwich the plates of the electrode assembly. With such a configuration, the plates can be sandwiched between the first portion and the second portion and hence, the plates can be easily fixed to the container thus suppressing the lowering of performance of the energy storage device.

The electrode assembly may include an element formed by stacking a plurality of plates, the first portion may have an opening portion corresponding to the element, and the second portion may sandwich the element inserted through the opening portion cooperatively with the first portion.

In this manner, the second portion of the terminal portion sandwiches the element inserted through the opening portion formed in the first portion cooperatively with the first portion. With such a configuration, the plates can be easily fixed to the terminal portion by inserting the element into the opening portion and by sandwiching the element by the first portion and the second portion.

The electrode assembly may include a plurality of elements, the first portion may have a plurality of opening portions corresponding to the plurality of elements, and the second portion may sandwich the plurality of elements inserted through the plurality of opening portions cooperatively with the first portion.

In this manner, the second portion of the terminal portion sandwiches the plurality of elements inserted through the plurality of opening portions formed in the first portion cooperatively with the first portion. With such a configuration, by sandwiching the plates in a state where the plates are divided into the plurality of elements, the number of plates that each element includes can be reduced and hence, a plate length necessary for sandwiching the plates can be shortened.

The opening portion may be an opening portion formed by opening a part of a periphery of the first portion.

In this manner, the opening portion formed in the first portion of the terminal portion is the opening portion formed by a part of the periphery of the first portion. With such a configuration, the plates can be inserted from an opening side of the first portion and hence, the plates can be easily inserted into the opening portion.

The first portion may be formed into a comb shape.

In this manner, the first portion of the terminal portion has a comb shape and hence, a plurality of plates can be easily inserted into the opening portions from one direction of the first portion.

The opening portion may be formed into a shape where a width of the opening portion is increased gradually in a direction toward the inside of the container.

In this manner, the plate is inserted into the opening portion formed in the first portion of the terminal portion from an inner side of the container and hence, a width of the opening portion is increased gradually in a direction toward an inner side of the container and hence, the plate can be easily inserted into the opening portion.

The terminal portion may include a welded portion where the first portion, the second portion and the plate are welded to each other.

In this manner, the plate is fixed to the first portion and the second portion of the terminal portion by welding and hence, the plate can be connected to the terminal portion firmly and with low resistance.

The first portion may have an insulating portion on an inner side of the container.

In this manner, the first portion of the terminal portion has the insulating portion on the inner side of the container and hence, even when the first portion is disposed close to the electrode assembly, short-circuiting between the first portion of the terminal portion and the opposite polarity electrodes of the electrode assembly whereby the energy storage device can be miniaturized.

The insulating portion may be formed into a shape where a width of the insulating portion is narrowed gradually in a direction toward the inside of the container.

In this manner, the insulating portion formed on the first portion of the terminal portion has a shape where a width of the insulating portion is narrowed gradually in a direction toward the inside of the container. Accordingly, in inserting the plate into the opening portion formed in the first portion from the inside of the container, it is possible to suppress contacting of the plate with the insulating portion and hence, the plate can be easily inserted into the opening portion.

The present invention can be realized not only in the form of such an energy storage device but also in the form of a terminal portion which the energy storage device includes or a first portion which the terminal portion includes.

Advantages of the Invention

According to the energy storage device of the present invention, the plate of the electrode assembly can be easily fixed to the container.

MODE FOR CARRYING OUT THE INVENTION

Hereinafter, an energy storage device according to an embodiment of the present invention is described with reference to drawings. The embodiment described hereinafter merely shows one preferred specific example of the present invention. Numerical values, shapes, materials, constitutional elements, arrangement positions of the constitutional elements, connection states of the constitutional elements, manufacturing steps, order of the manufacturing steps and the like in the embodiment described hereinafter are merely examples, and are not intended to limit the present invention. Further, with respect to the constitutional elements employed in the embodiment described hereinafter, the constitutional elements which are not described in independent claims where constitutional elements are described in the form of uppermost concept are described as arbitrary constitutional elements. Further, in the respective drawings, sizes and the like of the constitutional parts are not described strictly following sizes and the like of actual constitutional elements.

Embodiment

Firstly, a configuration of an energy storage device 10 is described.

Figure 1:
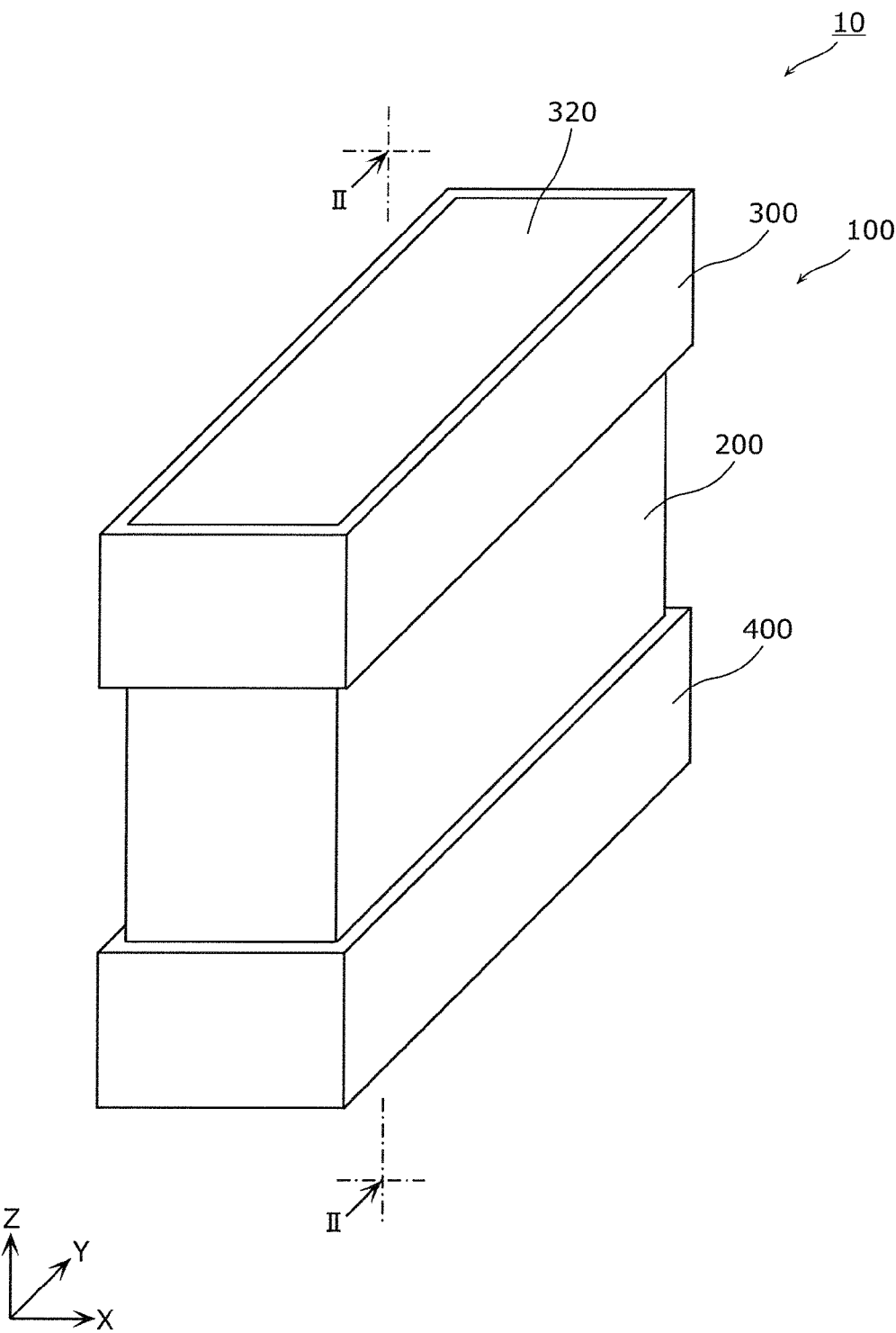
FIG. 1 is a perspective view schematically showing an external appearance of an energy storage device according to an embodiment of the present invention.
Figure 2:
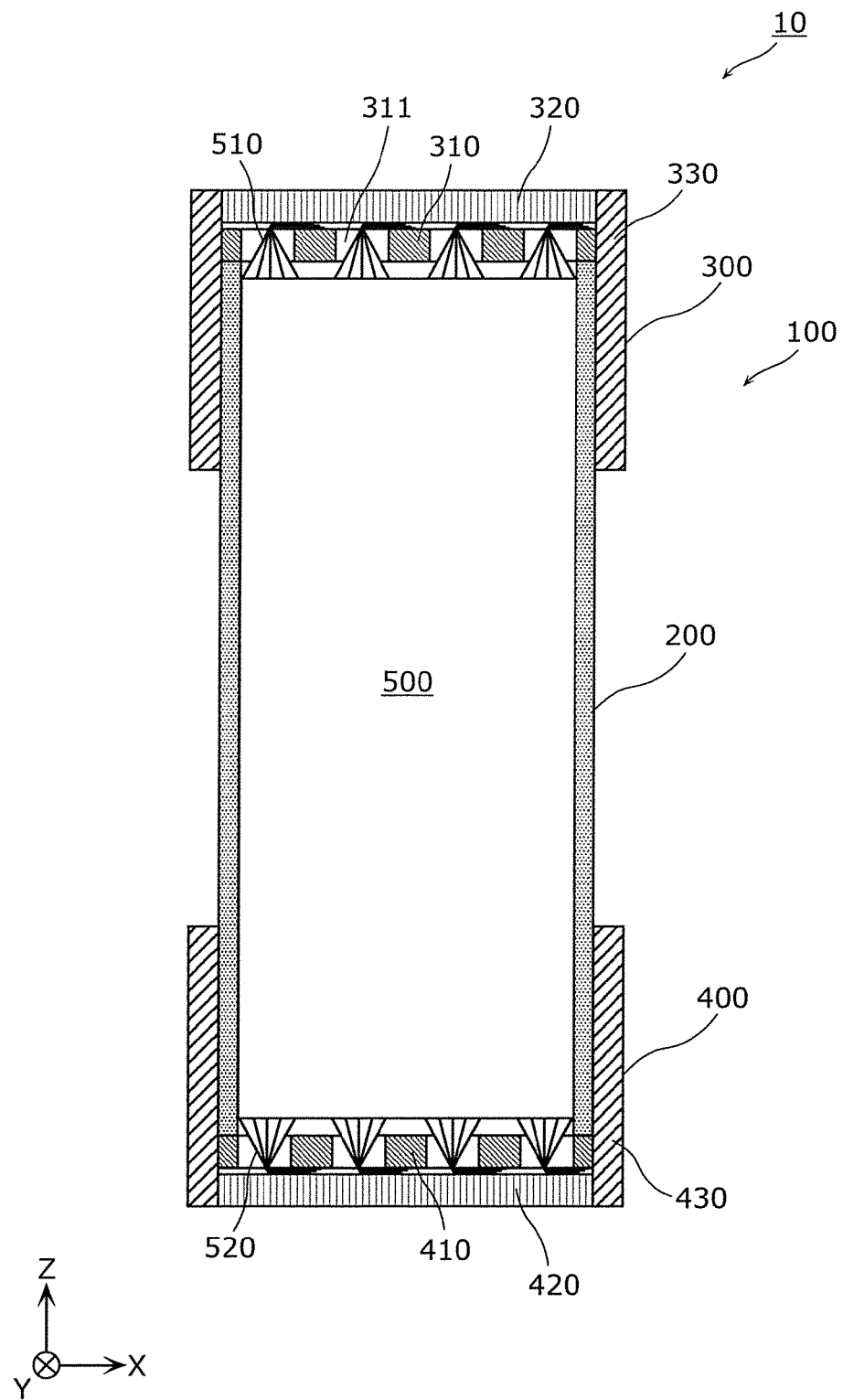
FIG. 2 is a cross-sectional view showing constitutional elements disposed in the inside of a container of the energy storage device according to the embodiment of the present invention.

FIG. 1 is a perspective view schematically showing an external appearance of the energy storage device 10 according to the embodiment of the present invention. Further, FIG. 2 is a cross-sectional view showing constitutional elements disposed in the inside of a container 100 of the energy storage device 10 according to the embodiment of the present invention. To be more specific, FIG. 2 is a cross-sectional view taken along a line II-II (a plane parallel to an X-Z plane) showing respective constitutional elements of the energy storage device 10 shown in FIG. 1.

The energy storage device 10 is a secondary battery which can charge electricity and can discharge electricity. To be more specific, the energy storage device 10 is a non-aqueous electrolyte secondary battery such as a lithium ion secondary battery. For example, the energy storage device 10 is used as a power source for a motorcycle such as an electric vehicle (EV), a hybrid electric vehicle (HEV), or a plug-in hybrid electric vehicle (PHEV), a power source for electronic equipment, a power source for storing an electric power or the like.

The energy storage device 10 is not limited to the non-aqueous electrolyte secondary battery, and may be a secondary battery other than the non-aqueous electrolyte secondary battery, or may be a capacitor. In this embodiment, the rectangular-shaped (prismatic) energy storage device 10 is described. However, a shape of the energy storage device 10 is not limited to a rectangular shape, and may be a circular columnar shape, an elongated circular columnar shape or the like.

As shown in these drawings, the energy storage device 10 includes a container 100, and an electrode assembly 500 accommodated in the container 100. The container 100 has a body portion 200 and terminal portions 300, 400. Although an electrolyte solution (non-aqueous electrolyte) and the like are also accommodated in the container 100, these components are not shown in the drawing. A kind of the electrolyte solution is not particularly limited so long as the electrolyte solution does not deteriorate performance of the energy storage device 10, and various kinds of electrolyte solution can be selected.

In the description made hereinafter and the attached drawings, a stacking direction of plates of the electrode assembly 500, a direction along which long-side surfaces of the body portion 200 of the container 100 opposedly face each other, a direction along which short-side surfaces of the body portion 200 extend laterally and a thickness direction of the body portion 200 are defined as an X axis direction. A direction along which short-side surfaces of the body portion 200 opposedly face each other and a direction along which long-side surfaces of the body portion 200 extend longitudinally are defined as a Y axis direction. A direction which intersects with the X axis direction and the Y axis direction and a direction along which the terminal portions 300, 400 are arranged in a row (a direction along which the terminal portions 300, 400 opposedly face each other) are defined as a Z axis direction. For example, with respect to the X axis direction, a direction indicated by an arrow is defined as a plus side in the X axis direction, and a direction opposite to the direction indicated by an arrow is defined as a minus side in the X axis direction. The same goes for the Y axis direction and the Z axis direction. In the drawings, the Z axis direction is indicated as a vertical direction and hence, there may be a case where the description is made by assuming the vertical direction as the Z axis direction. However, depending on a use state of the energy storage device 10, the case is considered where the Z axis direction does not become the vertical direction and hence, the Z axis direction is not limited to the vertical direction.

The container 100 is a prismatic container which has a rectangular shape. The container 100 is constituted of: the body portion 200 which has a rectangular cylindrical shape; and the terminal portions 300, 400 which respectively close opening portions of the body portion 200, respectively have a rectangular cylindrical shape, and respectively have a lid. The container 100 is formed by joining the body portion 200 and the terminal portions 300, 400 to each other by welding or the like. Accordingly, the container can hermetically seal the inside of the container 100 in a state where the electrode assembly 500 and the like are accommodated in the container 100.

The body portion 200 is a body portion (barrel portion) of the container 100 arranged at a center portion (the center in the Z axis direction) of the container 100. To be more specific, the body portion 200 is a quadrangular cylindrical-shaped member having two long-side surfaces arranged on both sides thereof in the X axis direction, and two short-side surfaces arranged on both sides thereof in the Y axis direction. The body portion 200 is a member having insulating property, and is made of a resin such as polypropylene (PP), polyethylene (PE), polyimide, polyvinylidene fluoride (PVDF), for example.

The terminal portions 300, 400 are members having a function as an electrode terminal and are arranged on both end portions of the container 100 (both sides in the Z axis direction). To be more specific, the terminal portions 300, 400 are members having conductivity which are connected to both ends of the body portion 200. That is, the terminal portion 300 and the terminal portion 400 are insulated from each other by sandwiching the body portion 200 having an insulating property therebetween. In other words, the body portion 200 has a function of insulating the terminal portion 300 and the terminal portion 400 from each other. Although a material for forming the terminal portions 300, 400 is not particularly limited, the terminal portions 300, 400 are made of metal such as stainless steel, aluminum, an aluminum alloy, copper, or nickel-plated iron, for example.

More specifically, the terminal portion 300 is electrically connected to plates on a positive electrode side (an element 510 described later) of the electrode assembly 500, and the terminal portion 400 is electrically connected to plates on a negative electrode side (an element 520 described later) of the electrode assembly 500. That is, the terminal portions 300, 400 are respectively formed of an electrode terminal for outputting electricity stored in the electrode assembly 500 to a space outside the energy storage device 10 and for inputting electricity to a space inside the energy storage device 10 for storing electricity in the electrode assembly 500. Further, the terminal portions 300, 400 are arranged at positions where the terminal portions 300, 400 sandwich the electrode assembly 500 therebetween from both sides of the electrode assembly 500, and are mounted on both end portions of the body portion 200 respectively. To be more specific, the terminal portions 300, 400 are fixed to the body portion 200 by welding or the like in a state where the terminal portions 300, 400 are arranged so as to cover both end portions of the body portion 200.

The electrode assembly 500 is a power generating element which includes positive electrode plates which are plates on a positive electrode side, negative electrode plates which are plates on a negative electrode side and separators. The electrode assembly 500 can store electricity therein. The positive electrode plate is obtained by forming a positive active material layer on a positive electrode substrate layer which is a current collecting foil made of aluminum, an aluminum alloy or the like. The negative electrode plate is obtained by forming a negative active material layer on a negative electrode substrate layer which is a current collecting foil made of copper, a copper alloy or the like.

As a positive active material used for forming the positive active material layer, provided that the positive active material can occlude and discharge lithium ions, known materials can be suitably used. Further, as a negative active material used for forming the negative active material layer, provided that the negative active material can occlude and discharge lithium ions, known materials can be suitably used. As the separator, a microporous sheet made of a resin or non-woven fabric can be used, for example. The above-mentioned current collecting foil may be formed as desired using a known material such as nickel, iron, stainless steel, titanium, baked carbon, conductive polymer, conductive glass or an Al—Cd alloy.

The electrode assembly 500 is formed by stacking the positive electrode plates, the negative electrode plates and the separators in layers in a state where the separator is sandwiched between the positive electrode plate and the negative electrode plate. To be more specific, the electrode assembly 500 is configured such that the flat-plate-shaped positive electrode plates and negative electrode plates are stacked to each other in a displaced manner from each other in the Z axis direction with the separator interposed between the positive electrode plate and the negative electrode plate. Further, the positive electrode plate has a portion where an active material is not applied (an active material layer is not formed) so that the base material layer is exposed (active material non-coated portion) on an edge portion thereof in a displacing direction. In the same manner, the negative electrode plate also has a portion where an active material is not applied (an active material layer is not formed) so that the base material layer is exposed (active material non-coated portion) on an edge portion thereof in a displacing direction.

That is, the electrode assembly 500 includes elements 510 on one end portion thereof in the Z axis direction (an end portion thereof on a plus side in the Z axis direction), and each element 510 is formed by stacking the active material non-coated portions of a plurality of positive electrode plates to each other in bundles. To be more specific, the active material non-coated portions of the plurality of positive electrode plates are divided into a plurality of bundles, and the element 510 is formed for every bundle. For example, a thickness of the active material non-coated portion (current collecting foil) of the positive electrode plate is approximately 5 µm to 20 µm, and one element 510 is formed by bundling approximately 30 to 40 active material non-coated portions, for example. In this embodiment, the positive electrode plates are divided into four bundles so that four elements 510 are formed.

Also on a negative electrode side, in the same manner as the positive electrode side, the electrode assembly 500 includes elements 520 on the other end portion thereof in the Z axis direction (an end portion thereof on a minus side in the Z axis direction), and each element is formed by stacking active material non-coated portions of the negative electrode plates to each other in bundles. The elements 510 are connected to the terminal portion 300, and the elements 520 are connected to the terminal portion 400.

In this embodiment, the electrode assembly 500 is formed of a stacked-type electrode assembly where flat-plate-shaped plates are stacked to each other. However, the electrode assembly 500 may be formed of a winding-type electrode assembly where elongated plates are wound, or the electrode assembly 500 may have a shape where elongated plates are folded in a bellows shape. Also in the electrode assembly 500 having any one of the above-mentioned shapes, the elements 510, 520 can be formed. The winding-type electrode assembly may be a flat electrode assembly. The flat winding-type electrode assembly has a shape which is obtained by forming an electrode assembly into a circular cylindrical shape by winding plates, and by collapsing the circular cylindrical electrode assembly in a radial direction. Accordingly, the flat winding-type electrode assembly has curved portions where plates are curved and straight portions where the plates are not curved. In the active material non-coated portion at the curved portion, the plates are folded back and hence, a density of the plates is higher than that of the plates at the straight portion. Accordingly, there may be a case where it is difficult to insert the electrode assembly in a first portion 310 described later. In this case, a cut (slit) extending along the curved portion may be formed in the active material non-coated portions at the curved portion of the electrode assembly. That is, the active material non-coated portions are not continuously formed at the curved portion. Due to the formation of the cut, it is possible to facilitate the insertion of the active material non-coated portion into the first portion 310.

Next, configurations of the terminal portions 300, 400 are described in more detail.

As shown in FIG. 2, the terminal portion 300 has the first portion 310, a second portion 320, and a third portion 330. The terminal portion 400 has a first portion 410, a second portion 420, and a third portion 430. In this embodiment, the terminal portion 300 and the terminal portion 400 have substantially the same configuration and hence, hereinafter, the description is made mainly with respect to the terminal portion 300, and the description of the terminal portion 400 is simplified or omitted.

The first portion 310 is a member connected to the body portion 200 and disposed at a position adjacently to the electrode assembly 500. The first portion 310 has opening portions 311 into which the elements 510 of the electrode assembly 500 are inserted respectively. The first portion 310 sandwiches the elements 510 inserted through the opening portions 311 cooperatively with the second portion 320. The configuration of the first portion 310 is described in detail hereinafter.

Figure 3:
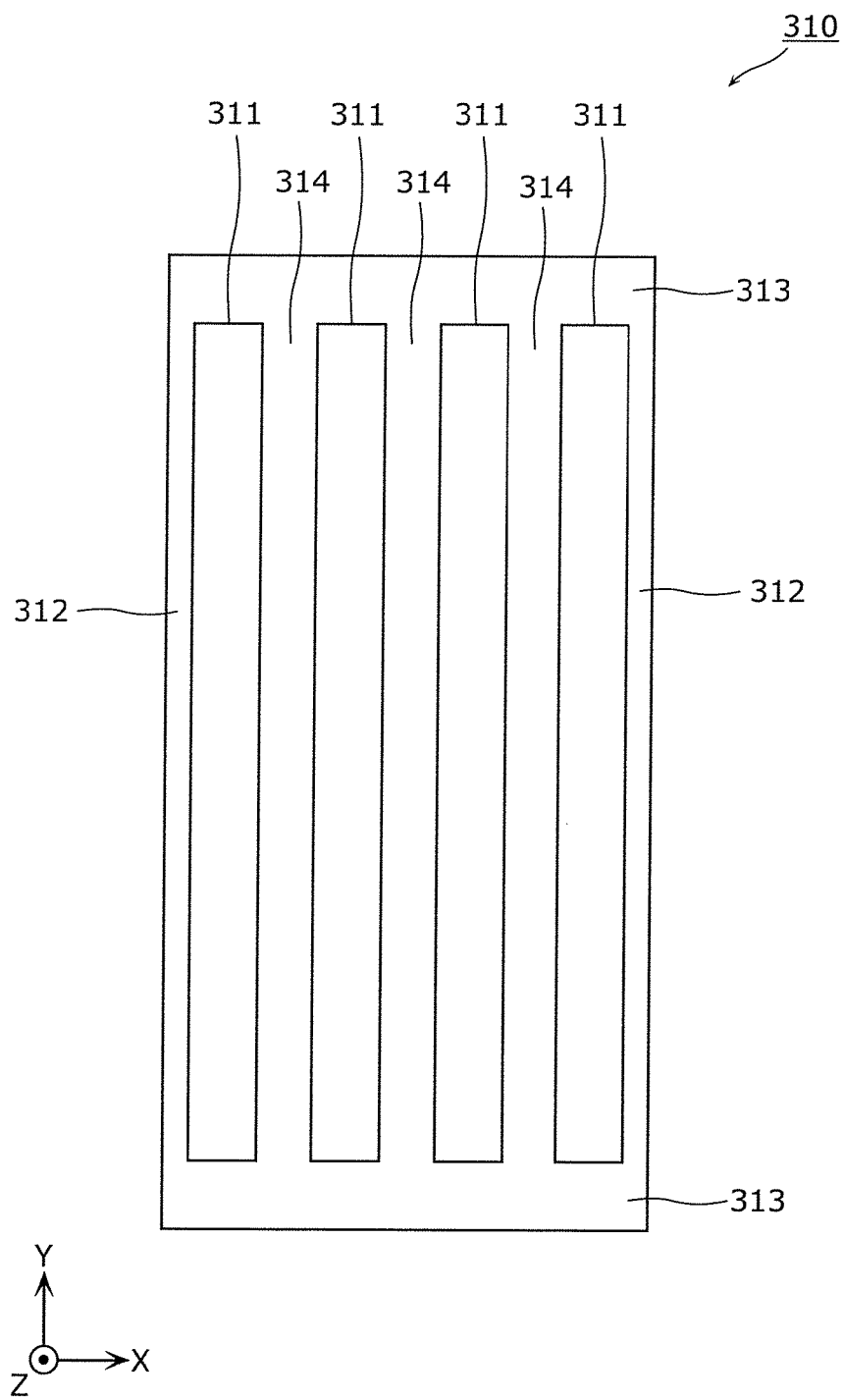
FIG. 3 is a plan view showing a configuration of a first portion of a terminal portion according to the embodiment of the present invention.

FIG. 3 is a plan view showing the configuration of the first portion 310 in the terminal portion 300 according to the embodiment of the present invention. To be more specific, FIG. 3 is a plan view showing the configuration of the first portion 310 as viewed from above (a plus side in the Z axis direction).

As shown in FIG. 3, the first portion 310 is a member having a rectangular flat plate shape, and the opening portions 311 extending in a longitudinal direction (Y axis direction) of the first portion 310 are formed in the first portion 310. The opening portion 311 is a through hole having an elongated rectangular shape which penetrates the first portion 310 in the Z axis direction. That is, the plurality of opening portions 311 (in this embodiment, four opening portions 311) are formed in the first portion 310 corresponding to the plurality of elements 510 (in this embodiment, four elements 510) of the electrode assembly 500. A shape of the opening portion 311 is not limited to a rectangular shape, and may be an elongated circular shape, an elliptical shape or the like. However, it is preferable that the opening portion 311 have a shape corresponding to a shape of the element 510.

The first portion 310 has a pair of first edge portions 312 arranged on edge portions of the first portion 310 on both sides in the X axis direction, a pair of second edge portions 313 arranged on edge portions of the first portion 310 on both sides in the Y axis direction, and three columnar portions 314 arranged at a center portion of the first portion 310.

The pair of first edge portions 312 are portions extending in the longitudinal direction (Y axis direction) of the first portion 310 and having an elongated rectangular shape (prismatic shape). The pair of second edge portions 313 are portions extending in the lateral direction (X axis direction) of the first portion 310 and having an elongated rectangular shape (prismatic shape). Three columnar portions 314 are portions arranged in parallel to each other between the pair of first edge portions 312, extending in the longitudinal direction (Y axis direction) of the first portion 310, and having an elongated rectangular shape (prismatic shape). The opening portions 311 are formed by the first edge portions 312, the second edge portions 313, and the columnar portions 314.

Returning to FIG. 2, the second portion 320 is a rectangular flat-plate-like member which constitutes a lid portion of the terminal portion 300. The second portion 320 is fitted in an opening of the third portion 330 and closes the opening of the third portion 330. The second portion 320 is disposed at a position where the second portion 320 sandwiches the elements 510 of the electrode assembly 500 inserted through the opening portions 311 formed in the first portion 310 cooperatively with the first portion 310. That is, the second portion 320 sandwiches the plurality of elements 510 inserted through the plurality of opening portions 311 cooperatively with the first portion 310.

In this manner, the terminal portion 300 includes the first portion 310 and the second portion 320 which sandwich the plates of the electrode assembly 500. Further, in a state where the elements 510 are sandwiched by the first portion 310 and the second portion 320, the first portion 310, the second portion 320 and the elements 510 are joined to each other by welding such as laser welding or resistance welding. The joining method is described in detail later.

The third portion 330 is a rectangular cylindrical member which constitutes a body of the terminal portion 300 together with the second portion 320. The third portion 330 is disposed so as to cover the periphery of an end portion of the body portion 200 of the container 100. To be more specific, the third portion 330 is a quadrangular cylindrical-shaped member having two long-side surfaces arranged on both sides thereof in the X axis direction and two short-side surfaces arranged on both sides thereof in the Y axis direction. That is, charging or discharging of the energy storage device 10 is performed by connecting an outer surface of the third portion 330 or an outer surface of the second portion 320 to a terminal portion or a conductive member of another energy storage device.

The first portion 310, the second portion 320 and the third portion 330 are respectively formed of a conductive member made of metal such as stainless steel or aluminum. However, all of these members may be formed of the same material or may be formed of different materials. The same goes also for the first portion 410, the second portion 420 and the third portion 430 of the terminal portion 400. For example, the first portion 310 and the second portion 320 may be made of aluminum or an aluminum alloy in the same manner as the positive electrode substrate layers of the electrode assembly 500, and the first portion 410 and the second portion 420 of the terminal portion 400 may be made of copper or a copper alloy in the same manner as the negative electrode substrate layers of the electrode assembly 500. The second portion 320 and the third portion 330 may be integrally formed by molding. Since the second portion 320 and the third portion 330 are integrally formed by molding, it is unnecessary to provide a step of joining the second portion 320 and the third portion 330 to each other. Further, the number of parts can be decreased.

A method of joining the body portion 200 and the third portion 330 to each other is not particularly limited. For example, the body portion 200 and the third portion 330 may be joined to each other using an adhesive agent such as an epoxy resin adhesive material, or may be joined to each other by thermal welding. To be more specific, for example, a joining portion containing a resin such as polypropylene (PP) is applied to the body portion 200 and the third portion 330 respectively. The joining portion can be formed by insert molding or the like, for example. Further, the body portion 200 and the third portion 330 are joined to each other by bringing the body portion 200 and the third portion 330 into contact with each other and by welding the body portion 200 and the third portion 330 to each other by melting the resin by heating. Although the resin used for forming the joining portion is not particularly limited, it is preferable to use polypropylene from a viewpoint of ensuring airtightness.

The container 100 is not limited to a prismatic (rectangular parallelepiped shaped) container, and may have other polygonal columnar shapes, a circular columnar shape or an elliptical columnar shape. That is, the shape of the body portion 200 is not limited to a quadrangular cylindrical shape, and the body portion 200 may have other polygonal cylindrical shapes, a circular cylindrical shape or an elliptical cylindrical shape. The same goes for the terminal portion 300 and the terminal portion 400.

Figure 4:
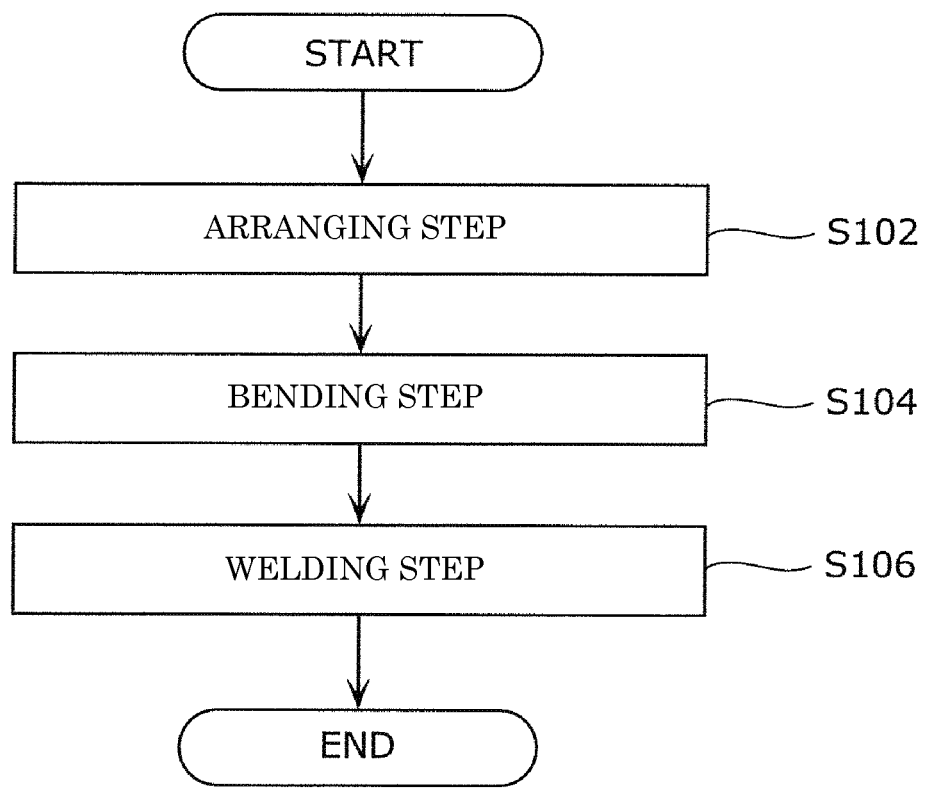
FIG. 4 is a flowchart showing a method of manufacturing the energy storage device according to the embodiment of the present invention.

Next, a method of manufacturing the energy storage device 10 is described. FIG. 4 is a flowchart showing the method of manufacturing the energy storage device 10 according to the embodiment of the present invention. To be more specific, FIG. 4 is a flowchart showing a step of connecting the terminal portion 300 to the electrode assembly 500 in the method of manufacturing the energy storage device 10. The terminal portion 400 has substantially the same configuration as the terminal portion 300 and hence, the description of a step of connecting the terminal portion 400 to the electrode assembly 500 is omitted.

Figure 5:
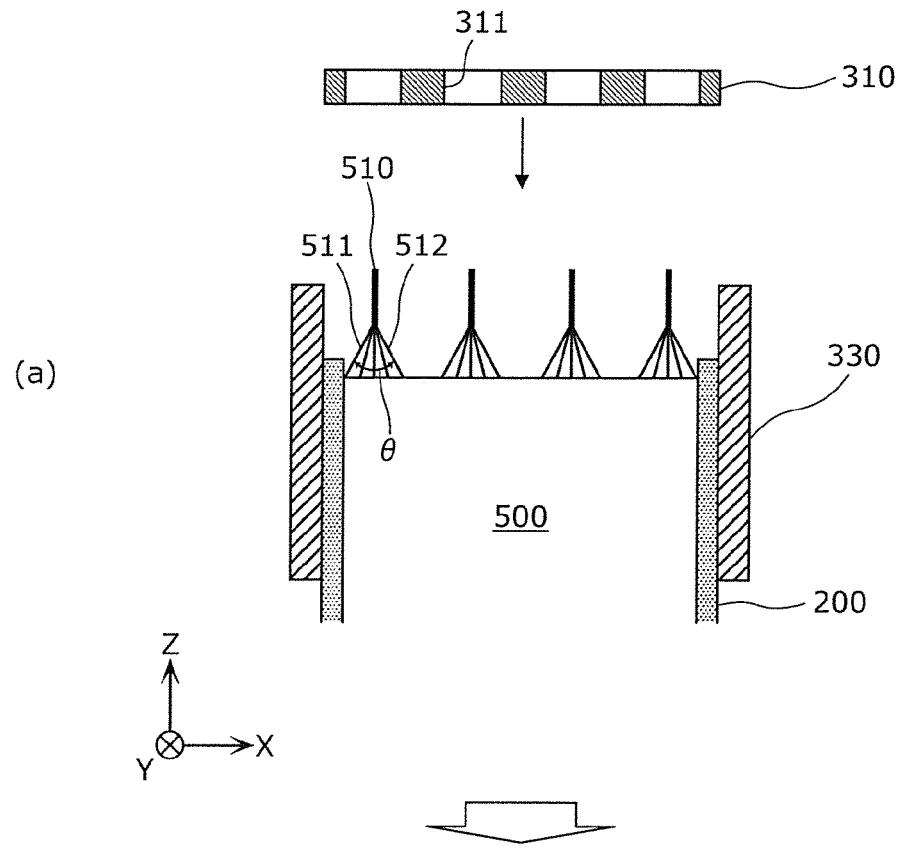
FIG. 5 is a view for describing an arranging step in the method of manufacturing the energy storage device according to the embodiment of the present invention.
Figure 5:
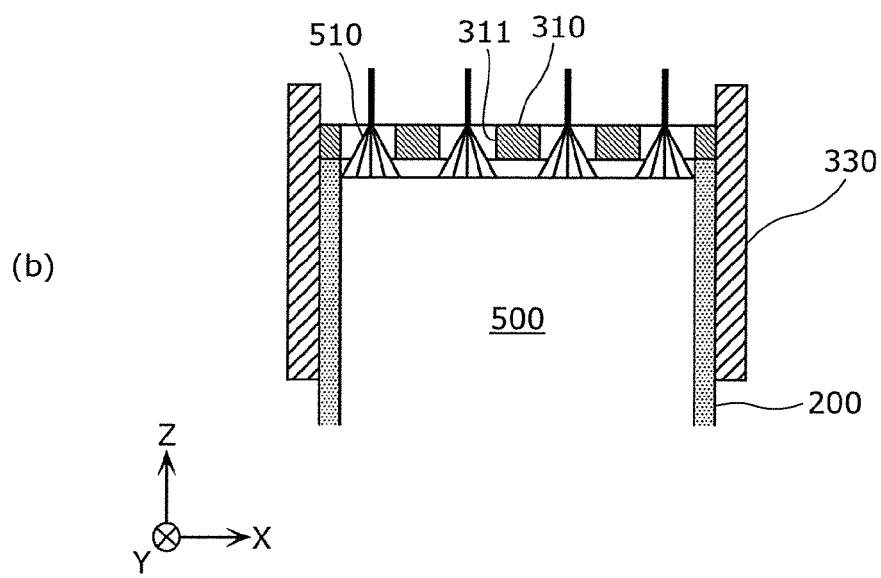
Figure 6:
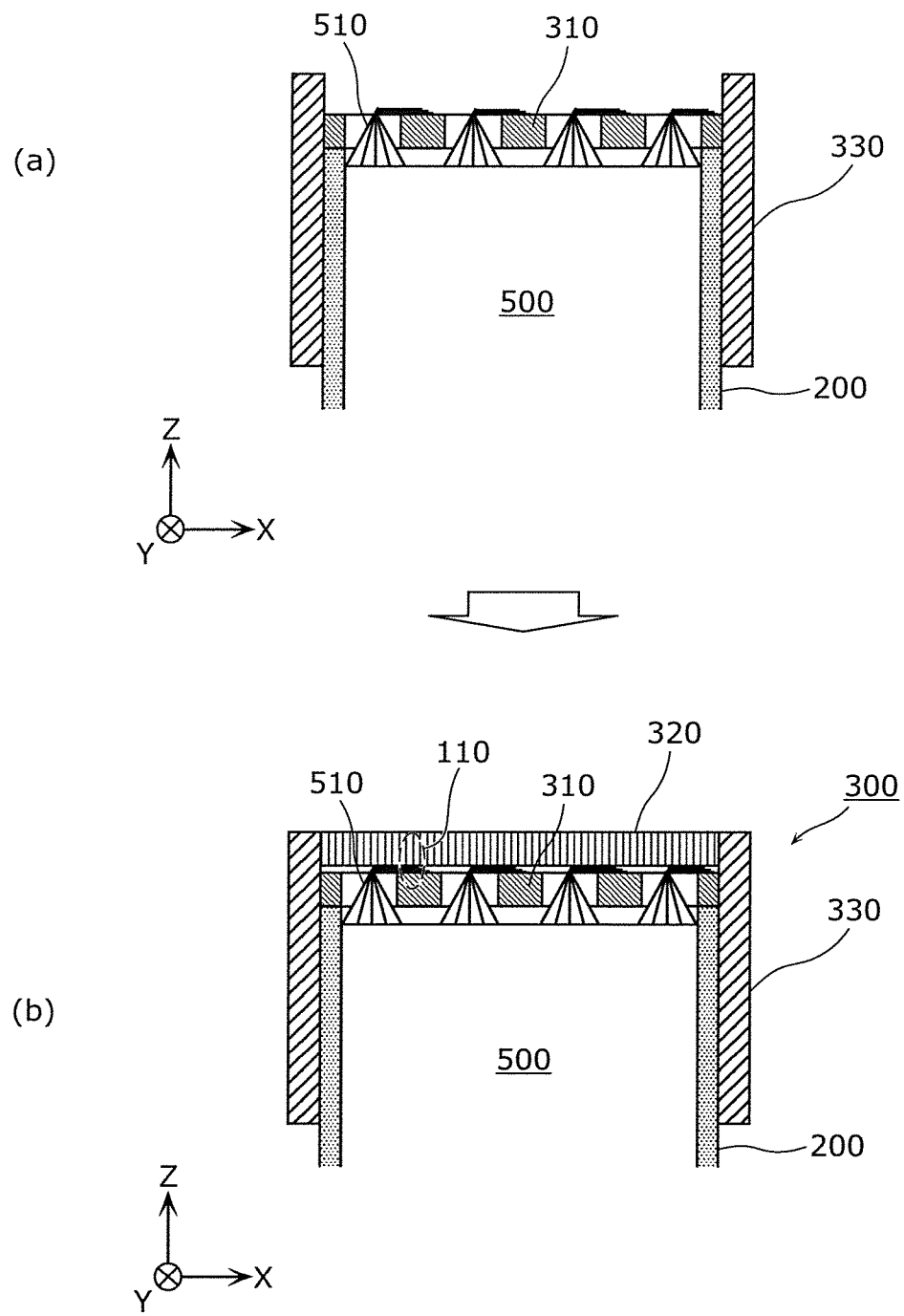
FIG. 6 is a view for describing a bending step and a welding step in the method of manufacturing the energy storage device according to the embodiment of the present invention.

Further, FIG. 5 is a view for describing an arranging step in the method of manufacturing the energy storage device 10 according to the embodiment of the present invention. FIG. 6 is a view for describing a bending step and a welding step in the method of manufacturing the energy storage device 10 according to the embodiment of the present invention. To be more specific, FIG. 6(a) shows the bending step, and FIG. 6(b) shows the welding step.

Firstly, as shown in FIG. 4, in the arranging step, the first portion 310 of the terminal portion 300 is arranged on the electrode assembly 500 (S102).

To be more specific, as shown in FIGS. 5(a) and 5(b), the first portion 310 of the terminal portion 300 is moved toward the electrode assembly 500 from above the electrode assembly 500 (from a plus side in the Z axis direction of the electrode assembly 500), and is inserted into the opening of the third portion 330. At this stage of the operation, the respective elements 510 of the electrode assembly 500 are inserted into the respective opening portions 311 formed in the first portion 310 from distal end portions of the elements 510. The element 510 is formed such that a distal end of the element 510 extends upward (to a plus side in the Z axis direction). Then, the first portion 310 is mounted on an upper surface of the body portion 200 of the container 100 so that the first portion 310 can be arranged on the electrode assembly 500.

It is preferable that an angle θ made by an plate 511 (the plate on a minus side in the X axis direction) and an plate 512 (the plate on a plus side in the X axis direction) both of which are outermost plates out of the plurality of plates included in the element 510 be set to 100° or less, and it is more preferable to set such an angle θ to 90° or less. This is because a load applied to the plates can be decreased. However, from a viewpoint of suppressing a projection length of the element 510 toward a plus side in the Z axis direction, it is preferable to set the angle θ to a larger value and hence, it is most preferable to set the angle θ to 90°.

Returning to FIG. 4, as a next step, in the bending step, the elements 510 of the electrode assembly 500 are bent along the first portion 310 of the terminal portion 300 (S104).

To be more specific, as shown in FIG. 6(a), portions of the respective elements 510 of the electrode assembly 500 which project from the first portion 310 of the terminal portion 300 are bent along the upper surface of the first portion 310. Due to such an operation, the distal end portions of the elements 510 are arranged on the first portion 310. The method of bending the elements 510 is not particularly limited, and the elements 510 may be bent by curving instead of bending by folding. Further, it is preferable that the distal end portions of the outermost plates 511 (the plates on a minus side in the X axis direction) described with reference to FIG. 5 be arranged on the first portion 310 after the elements 510 are bent.

Returning to FIG. 4, as a next step, in the welding step, the elements 510 of the electrode assembly 500 are welded to the first portion 310 and the second portion 320 of the terminal portion 300 (S106).

To be more specific, as shown in FIG. 6(b), the second portion 320 of the terminal portion 300 is moved toward the electrode assembly 500 from above the electrode assembly 500 (from a plus side in the Z axis direction), and is inserted into the opening of the third portion 330. With such an operation, the second portion 320 is arranged at the position where the second portion 320 sandwiches the respective elements 510 of the electrode assembly 500 inserted through the opening portions 311 formed in the first portion 310 cooperatively with the first portion 310. In this manner, by fitting the second portion 320 in the opening of the third portion 330 thus sandwiching the elements 510 between the first portion 310 and the second portion 320, the second portion 320 can be firmly fixed so that the elements 510 can be firmly sandwiched by the first portion 310 and the second portion 320.

Then, in a state where the elements 510 are sandwiched by the first portion 310 and the second portion 320, a laser beam is irradiated from a second portion 320 side so that the elements 510 are welded to the first portion 310 and the second portion 320. With such an operation, welded portions (for example, a welded portion 110 in FIG. 6(b)) where the first portion 310, the second portion 320 and the element 510 are integrally formed with each other (integrated) are formed. That is, the terminal portion 300 includes the welded portions 110 at each of which the first portion 310, the second portion 320 and the element 510 are welded to each other. In this manner, welding is performed for each element 510, and the welded portion is formed for each element 510. Welding is not limited to laser welding and may be resistance welding or the like. Further, joining of these portions is not limited to joining by welding, and may be mechanical joining such as caulking, engaging or fitting.

The energy storage device 10 is manufactured as described above. Hereinafter, the description is made with respect to an energy storage apparatus (assembled battery) which includes a plurality of energy storage devices 10 manufactured as described above.

Figure 7A:
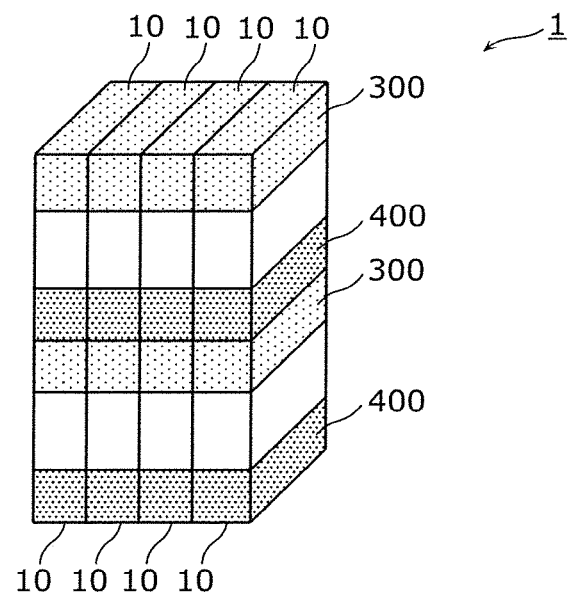
FIG. 7A is a perspective view schematically showing an energy storage apparatus including a plurality of energy storage devices according to the embodiment of the present invention.
Figure 7B:
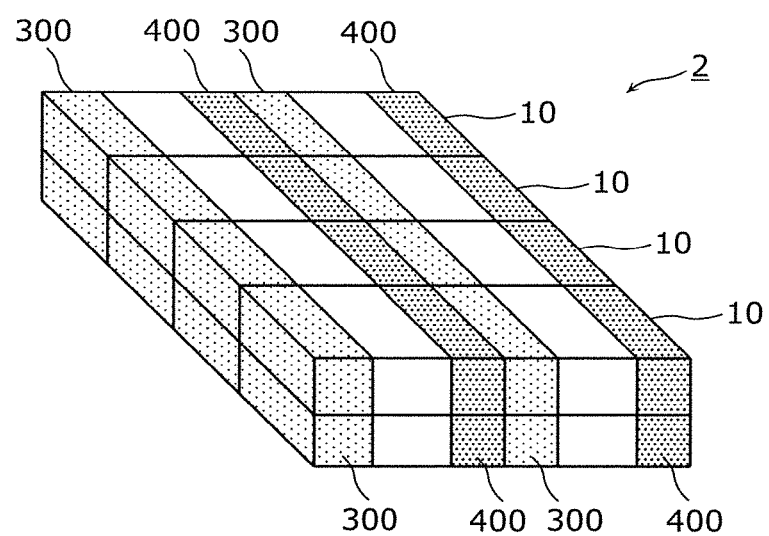
FIG. 7B is a perspective view schematically showing an energy storage apparatus including a plurality of energy storage devices according to the embodiment of the present invention.
Figure 7C:
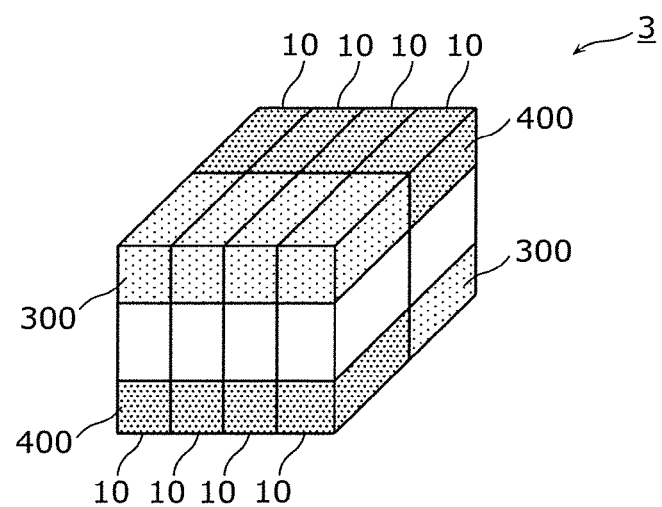
FIG. 7C is a perspective view schematically showing an energy storage apparatus including a plurality of energy storage devices according to the embodiment of the present invention.

FIG. 7A to FIG. 7C are perspective views schematically showing energy storage apparatuses 1 to 3 each of which includes a plurality of energy storage devices 10 according to the embodiment of the present invention.

As shown in FIG. 7A, the energy storage apparatus 1 has the configuration where two sets of four energy storage devices 10 connected in parallel to each other are connected to each other in series. That is, by connecting the terminal portions 300 of four energy storage devices 10 to each other and by connecting the terminal portions 400 of four energy storage devices 10 to each other, one set of energy storage device group which is constituted of four energy storage devices 10 connected to each other in parallel is formed. Further, by connecting the terminal portions 300 of one of two energy storage device groups and the terminal portions 400 of the other of two energy storage device groups to each other, two sets of energy storage device groups are connected to each other in series thus forming the energy storage apparatus 1. In this manner, by directly connecting the terminal portions to each other, it is unnecessary to provide bus bars for connecting the energy storage devices 10 to each other and hence, the energy storage apparatus 1 can be easily formed at a low cost. Further, it is unnecessary to provide bus bars and hence, an energy density of the energy storage apparatus 1 per volume or weight can be increased.

Further, as shown in FIG. 7B, an energy storage apparatus 2 has the configuration where two sets of eight energy storage devices 10 connected in parallel to each other are connected to each other in series. Further, as shown in FIG. 7C, an energy storage apparatus 3 has the configuration where two sets of four energy storage devices 10 connected in parallel to each other are connected to each other in series. These energy storage apparatuses 2, 3 can be also easily formed at a low cost in the same manner as the energy storage apparatus 1.

As described above, according to the energy storage device 10 of the embodiment of the present invention, the terminal portion 300 of the container 100 includes the first portion 310 and the second portion 320 which sandwich the plates of the electrode assembly 500 therebetween. Accordingly, the plates are sandwiched by the first portion 310 and the second portion 320 and hence, the plates can be easily fixed to the container 100 thus suppressing lowering of performance of the energy storage device 10.

The second portion 320 of the terminal portion 300 sandwiches the elements 510 inserted through the opening portions 311 formed in the first portion 310 cooperatively with the first portion 310. With such a configuration, the elements 510 are inserted into the opening portions 311 and are sandwiched by the first portion 310 and the second portion 320 and hence, the plates can be easily fixed to the terminal portion 300.

The second portion 320 of the terminal portion 300 sandwiches the plurality of elements 510 inserted through the plurality of opening portions 311 formed in the first portion 310 cooperatively with the first portion 310. With such a configuration, the plates are sandwiched in a state where the plates are divided into the plurality of elements 510 and hence, the number of plates included in the element 510 can be decreased. Accordingly, it is possible to decrease a plate length necessary for sandwiching the plates between the first portion 310 and the second portion 320.

Further, the plates are fixed to the first portion 310 and the second portion 320 of the terminal portion 300 by welding and hence, the plates can be firmly connected to the terminal portion 300 with low resistance.

The terminal portion 400 side also has substantially the same configuration as the terminal portion 300 side and hence, the terminal portion 400 side can acquire substantially the same advantageous effects as the terminal portion 300 side.

(First Modification)

Next, a first modification of the above-mentioned embodiment is described. In the above-mentioned embodiment, the first portion 310 has a shape where the plurality of through holes are formed in the first portion 310. However, in this modification, a first portion has a comb shape.

Figure 8:
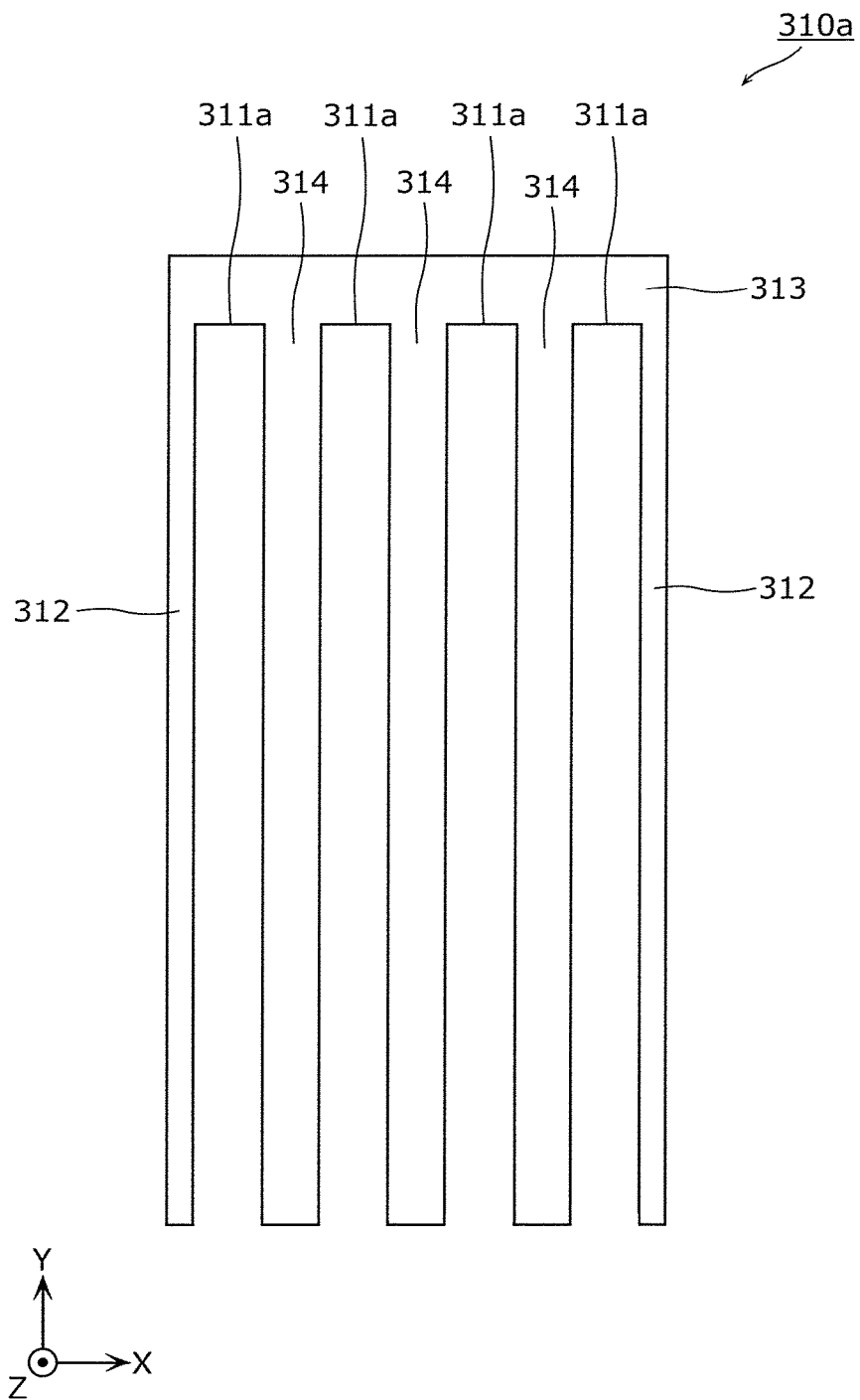
FIG. 8 is a plan view showing a configuration of a first portion according to a first modification of the embodiment of the present invention.

FIG. 8 is a plan view showing the configuration of a first portion 310a according to the first modification of the embodiment of the present invention. To be more specific, FIG. 8 is a view which corresponds to FIG. 3.

As shown in FIG. 8, the first portion 310a of this modification has, in the same manner as the first portion 310 in the above-mentioned embodiment, a pair of first edge portions 312 arranged on edge portions thereof on both sides in the X axis direction, and three columnar portions 314 arranged at a center portion thereof. However, the first portion 310a has a second edge portion 313 arranged on an edge portion thereof on a plus side in the Y axis direction in place of the pair of second edge portions 313 which the first portion 310 in the above-mentioned embodiment includes and which is arranged on the edge portions of the first portion 310 on both sides in the Y axis direction. That is, the first portion 310a does not have a second edge portion 313 on an edge portion thereof on a minus side in the Y axis direction.

With such a configuration, opening portions 311a are formed in the first portion 310a. That is, the opening portion 311a is not formed of a through hole but is formed of an opening portion which is formed by opening a portion of the periphery of the first portion 310a. To be more specific, the opening portion 311a is a rectangular cutout portion formed by cutting out a portion of the first portion 310a from a minus side in the Y axis direction. The opening portion 311a may be a cutout portion formed by cutting out a portion of the first portion 310a into an elongated circular shape or into an elliptical shape.

Accordingly, the first portion 310a has a comb shape. That is, the plurality of opening portions 311a which open on the same side (minus side in the Y axis direction) are formed in the first portion 310a. Other configurations of the first modification are substantially equal to the corresponding configurations of the above-mentioned embodiment and hence, the detailed description of other configurations is omitted.

With such a configuration, the energy storage device according to this modification can acquire substantially the same advantageous effects as the above-mentioned embodiment. Particularly, according to this modification, the opening portions 311a formed in the first portion 310a are the opening portions formed by opening portions of the periphery of the first portion 310a and hence, plates can be easily inserted into the opening portions 311a by inserting the plates from a side where the first portions 310a are opened. Further, the first portion 310a has a comb shape and hence, the plurality of plates can be easily inserted into the opening portions 311a from one side of the first portion 310a.

In this modification, all of the plurality of opening portions 311a open on the same side. However, some opening portions 311a may be formed such that these opening portions 311a open on a different side. Further, the first portion 310a may have the configuration where only one opening portion 311a is formed in the first portion 310a.

In this modification, although the description has been made with respect to the configuration on a terminal portion 300 side, a terminal portion 400 side also has substantially the same configuration. The same goes also for the following modifications.

(Second Modification)

Next, a second modification of the above-mentioned embodiment is described. In the above-mentioned embodiment, the opening portions 311 formed in the first portion 310 are rectangular through holes which penetrate the first portion 310 in a direction toward the inside of the container 100 with the same shape. However, in this modification, an opening portion formed in a first portion has a shape where a width of the opening portion is increased gradually in a direction toward the inside of a container 100.

Figure 9:
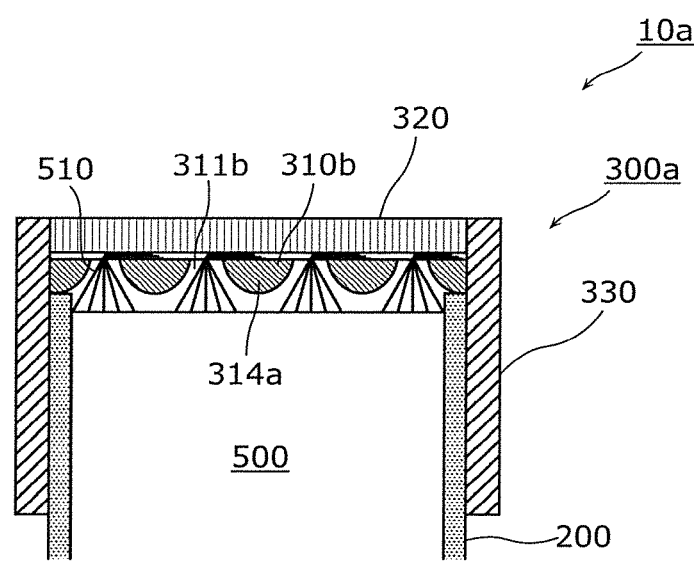
FIG. 9 is a cross-sectional view showing a configuration of an energy storage device according to a second modification of the embodiment of the present invention.

FIG. 9 is a cross-sectional view showing the configuration of an energy storage device 10a according to the second modification of the embodiment of the present invention. To be more specific, FIG. 9 is a view showing the configuration of the energy storage device 10a which corresponds to the configuration of the energy storage device 10 on a terminal portion 300 side shown in FIG. 2.

As shown in FIG. 9, the energy storage device 10a of this modification includes a terminal portion 300a in place of the terminal portion 300 which the energy storage device 10 of the above-mentioned embodiment includes, and the terminal portion 300a includes a first portion 310b in place of the first portion 310 which the terminal portion 300 of the above-mentioned embodiment includes. Other configurations of the energy storage device 10a are substantially equal to the corresponding configurations of the energy storage device 10 of the above-mentioned embodiment and hence, the detailed description of other configurations is omitted.

The first portion 310b has opening portions 311b each having a width which is increased gradually in a direction toward the inside of the container 100. That is, the first portion 310b has columnar portions 314a each having a width which is narrowed gradually in a direction toward the inside of the container 100. In this modification, the columnar portion 314a has a semi-circular columnar shape. However, provided that the columnar portion 314a has a shape where a width of the columnar portion 314a is narrowed gradually in a direction toward the inside of the container 100 such as a semielliptical columnar shape, a semi-elongated-circular columnar shape, a triangular columnar shape, for example, the shape of the columnar portion 314a is not particularly limited. In this modification, however, from a viewpoint of preventing the element 510 from being damaged or the like, it is preferable that a side surface of the columnar portion 314a be a curved surface.

With such a configuration, the energy storage device 10a according to this modification can acquire substantially the same advantageous effects as the above-mentioned embodiment. Particularly in this modification, plates of an electrode assembly 500 are inserted into the opening portions 311b formed in the first portion 310b of the terminal portion 300a from the inside of the container 100. Accordingly, the opening portions 311b are configured such that a width of the opening portion 311b is increased gradually in a direction toward the inside of the container 100 and hence, the plates can be easily inserted into the opening portion 311b.

(Third Modification)

Next, a third modification of the above-mentioned embodiment is described. In the above-mentioned embodiment, the first portion 310 is formed of a conductive member. However, in this modification, a first portion includes an insulating portion on an inner side of a container.

Figure 10:
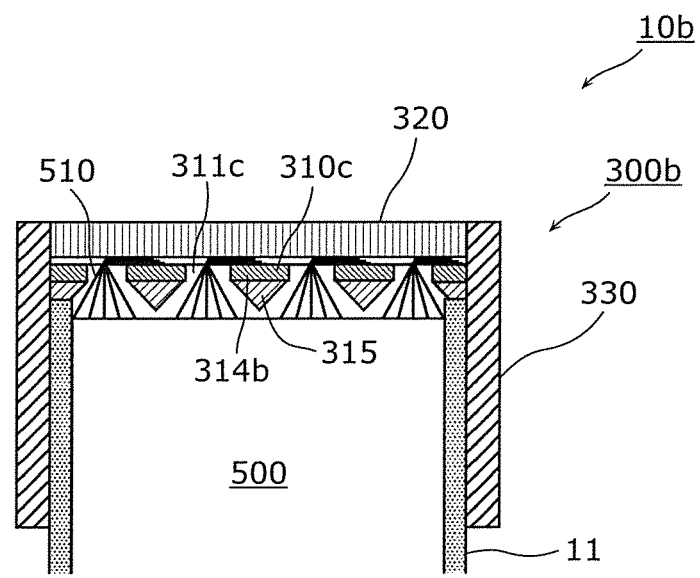
FIG. 10 is a cross-sectional view showing a configuration of an energy storage device according to third modification of the embodiment of the present invention.

FIG. 10 is a cross-sectional view showing the configuration of an energy storage device 10b according to the third modification of the embodiment of the present invention. To be more specific, FIG. 10 is a view showing the configuration of the energy storage device 10b which corresponds to the configuration of the energy storage device 10 on a terminal portion 300 side shown in FIG. 2.

As shown in FIG. 10, in this modification, the energy storage device 10b includes a terminal portion 300b in place of the terminal portion 300 which the energy storage device 10 of the above-mentioned embodiment includes. The terminal portion 300b includes a first portion 310c in place of the first portion 310 which the terminal portion 300 of the above-mentioned embodiment includes. Other configurations of the energy storage device 10b are substantially equal to the corresponding configurations of the energy storage device 10 of the above-mentioned embodiment and hence, the detailed description of other configurations is omitted.

The first portion 310c includes conductive columnar portions 314b and insulating column distal end portions 315 in place of the conductive columnar portions 314 which the first portion 310 of the above-mentioned embodiment includes. In the same manner as the columnar portions 314, the columnar portions 314b are portions which extend in a longitudinal direction (Y axis direction) of the first portion 310c and has an elongated rectangular shape (prismatic shape). Also with respect to a material for forming the columnar portions 314b, a conductive material substantially equal to the material for forming the columnar portion 314 can be used.

The column distal end portion 315 is an insulating portion arranged on a distal end of the columnar portion 314b (an end portion on an inner side of the container 100). That is, the first portion 310c includes the insulating portions on an inner side of the container 100. Although a material for forming the column distal end portions 315 is not particularly limited, the column distal end portions 315 are made of a resin such as PP, PE, for example.

The column distal end portion 315 has a shape where a width of the column distal end portion 315 is narrowed gradually in a direction toward the inside of the container 100. To be more specific, the column distal end portion 315 is disposed between two opening portions 311c, and has a shape where a width of the column distal end portion 315 in a direction along which two opening portions 311c are arranged in parallel to each other is narrowed gradually in a direction toward the inside of the container 100. With such a configuration, the opening portion 311c has a shape where a width of the opening portion 311c is increased gradually in a direction toward the inside of the container 100.

In this modification, the column distal end portion 315 has a triangular columnar shape. However, the shape of the column distal end portion 315 is not particularly limited provided that the column distal end portion 315 has a shape where a width of the column distal end portion 315 is narrowed gradually in a direction toward the inside of the container 100 such as a semicircular columnar shape, a semielliptical columnar shape, a semi-elongated-circular columnar shape, for example.

With such a configuration, the energy storage device 10b according to this modification can acquire substantially the same advantageous effects as the above-mentioned embodiment. Particularly, according to this modification, the first portion 310c of the terminal portion 300b includes the column distal end portions 315 which form the insulating portions on an inner side of the container 100. Accordingly, even when the first portion 310c is disposed close to the electrode assembly 500, short-circuiting between the first portion of 310c of the terminal portion 300b and the opposite polarity electrodes of the electrode assembly 500 can be suppressed whereby the energy storage device 10b can be miniaturized. Further, the column distal end portion 315 which forms the insulating portion formed on the first portion 310c of the terminal portion 300b has a shape where a width of the column distal end portion 315 is narrowed gradually in a direction toward the inside of the container 100. Accordingly, in inserting plates of the electrode assembly 500 into the opening portions 311c of the first portion 310c from the inside of the container 100, it is possible to suppress that the plates are brought into contact with the column distal end portions 315 so that the plates can be easily inserted into the opening portions 311c.

In this modification, the column distal end portion 315 may not be formed into a shape where a width of the column distal end portion 315 is narrowed gradually in a direction toward the inside of the container 100. For example, the column distal end portion 315 may be formed into a prismatic shape or the like.

(Fourth Modification)

Next, a fourth modification of the above-mentioned embodiment is described. In the above-mentioned embodiment, the second portion 320 is formed of a flat-plate-shaped member (a lower surface of the second portion 320 being a flat surface). However, in this modification, recessed portions in which elements 510 of the electrode assembly 500 are respectively accommodated are formed on a second portion.

Figure 11:
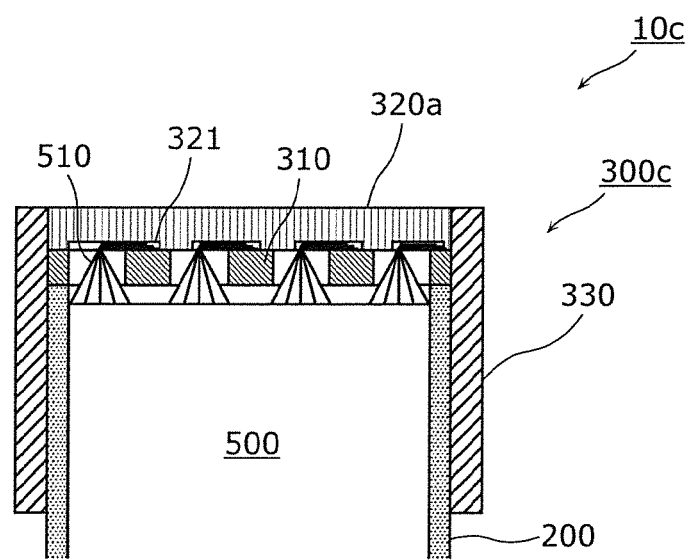
FIG. 11 is a cross-sectional view showing a configuration of an energy storage device according to a fourth modification of the embodiment of the present invention.

FIG. 11 is a cross-sectional view showing the configuration of an energy storage device 10c according to the fourth modification of the embodiment of the present invention. To be more specific, FIG. 11 is a view showing the configuration of the energy storage device 10c which corresponds to the configuration of the energy storage device 10 on a terminal portion 300 side shown in FIG. 2.

As shown in FIG. 11, the energy storage device 10c of this modification includes a terminal portion 300c in place of the terminal portion 300 which the energy storage device 10 of the above-mentioned embodiment includes. The terminal portion 300c includes a second portion 320a in place of the first portion 310 which the terminal portion 300 of the above-mentioned embodiment includes. Other configurations of the energy storage device 10c are substantially equal to corresponding configurations of the energy storage device 10 of the above-mentioned embodiment and hence, the detailed description of other configurations is omitted.

Recessed portions 321 in each of which an element 510 of an electrode assembly 500 is accommodated are formed on a surface (lower surface) of the second portion 320a on a side where the electrode assembly 500 is arranged. The recessed portions 321 are respectively formed of a rectangular-shaped groove portion extending in a longitudinal direction (Y axis direction) of the second portion 320a, and are formed at positions corresponding to the elements 510. That is, in this modification, four recessed portions 321 are formed on the second portion 320a corresponding to four elements 510. With such a configuration, the second portion 320a is brought into contact with the first portion 310 in a state where the second portion 320a sandwiches the elements 510 cooperatively with the first portion 310.

With such a configuration, the energy storage device 10c according to this modification can acquire substantially the same advantageous effects as the above-mentioned embodiment. Particularly, in this modification, the recessed portions 321 are formed on the second portion 320a and the second portion 320a can be brought into contact with the first portion 310 and hence, the second portion 320a can be fixed in a stable manner.

(Fifth Modification)

Next, a fifth modification of the above-mentioned embodiment is described. In the above-mentioned embodiment, the first portion 310 is formed of a flat-plate-shaped member (an upper surface of the first portion 310 being a flat surface). However, in this modification, recessed portions in each of which an element 510 of the electrode assembly 500 is accommodated are formed on a first portion.

Figure 12:
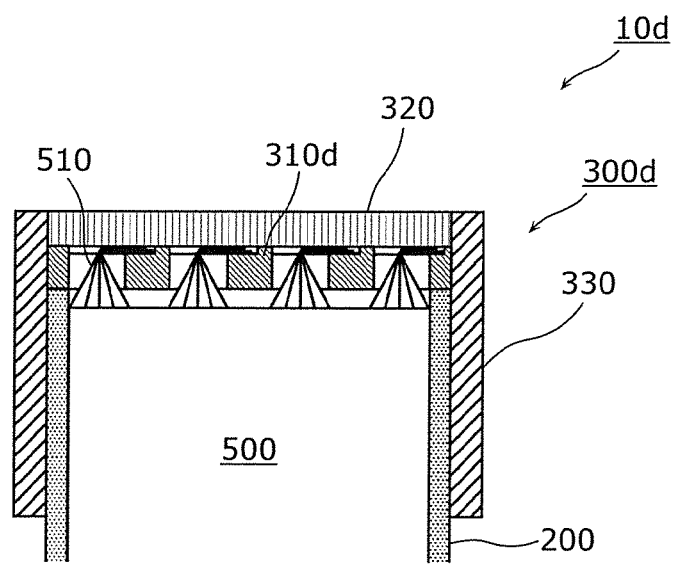
FIG. 12 is a cross-sectional view showing a configuration of an energy storage device according to a fifth modification of the embodiment of the present invention.
Figure 12:
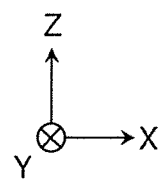

FIG. 12 is a cross-sectional view showing the configuration of an energy storage device 10d according to the fifth modification of the embodiment of the present invention. To be more specific, FIG. 12 is a view showing the configuration of the energy storage device 10d which corresponds to the configuration of the energy storage device 10 on a terminal portion 300 side shown in FIG. 2.

As shown in FIG. 12, the energy storage device 10d of this modification includes a terminal portion 300d in place of the terminal portion 300 which the energy storage device 10 of the above-mentioned embodiment includes. The terminal portion 300d includes a first portion 310d in place of the first portion 310 which the terminal portion 300 of the above-mentioned embodiment includes. Other configurations of the energy storage device 10d are substantially equal to corresponding configurations of the energy storage device 10 of the above-mentioned embodiment and hence, the detailed description of other configurations is omitted.

Recessed portions in each of which an element 510 of an electrode assembly 500 is accommodated are formed on a surface (an upper surface) of the first portion 310d on a side where the electrode assembly 500 is arranged. The recessed portions are respectively formed of a rectangular groove portion extending in a longitudinal direction (Y axis direction) of the first portion 310d, and are formed at positions corresponding to the elements 510. That is, in this modification, four recessed portions are formed on the first portion 310d corresponding to four elements 510. With such a configuration, the first portion 310d is brought into contact with the second portion 320 in a state where the first portion 310d sandwiches the elements 510 cooperatively with the second portion 320.

With such a configuration, the energy storage device 10d according to this modification can acquire substantially the same advantageous effects as the above-mentioned embodiment. Particularly, according to this modification, the recessed portions are formed on the first portion 310d and the second portion 320 can be brought into contact with the first portion 310d and hence, the second portion 320 can be fixed in a stable manner.

(Sixth Modification)

Next, a sixth modification of the above-mentioned embodiment is described. In the above-mentioned embodiment, the second portion 320 is disposed in a state where the second portion 320 is inserted into the opening of the third portion 330. However, in this modification, a second portion is arranged in a state where the second portion is brought into contact with a distal end portion of a third portion.

Figure 13:
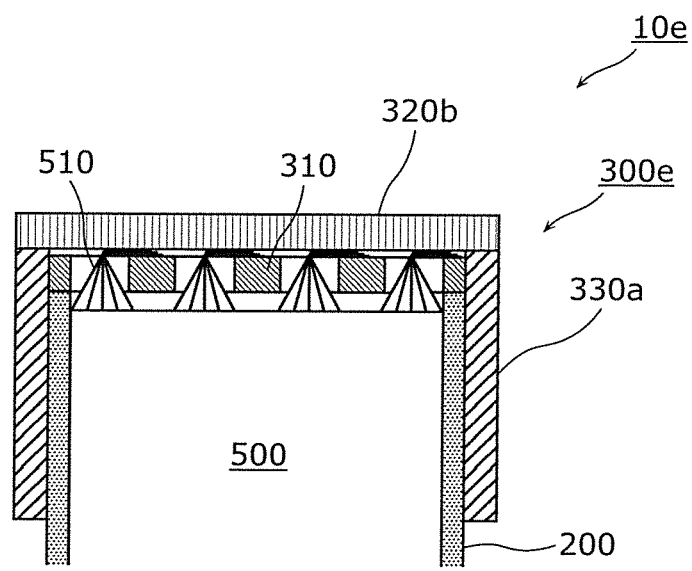
FIG. 13 is a cross-sectional view showing a configuration of an energy storage device according to a sixth modification of the embodiment of the present invention.
Figure 13:
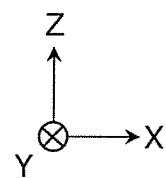

FIG. 13 is a cross-sectional view showing the configuration of an energy storage device 10e according to the sixth modification of the embodiment of the present invention. To be more specific, FIG. 13 is a view showing the configuration of the energy storage device 10e which corresponds to the configuration of the energy storage device 10 on a terminal portion 300 side shown in FIG. 2.

As shown in FIG. 13, the energy storage device 10e of this modification includes a terminal portion 300e in place of the terminal portion 300 which the energy storage device 10 of the above-mentioned embodiment includes. The terminal portion 300e includes a second portion 320b and a third portion 330a in place of the second portion 320 and the third portion 330 which the terminal portion 300 of the above-mentioned embodiment includes. Other configurations of the energy storage device 10e are substantially equal to corresponding configurations of the energy storage device 10 of the above-mentioned embodiment and hence, the detailed description of other configurations is omitted.

The second portion 320b is formed of a flat-plate-shaped member, and is disposed in a state where the second portion 320d is brought into contact with a distal end portion of the third portion 330a. That is, the second portion 320b is brought into contact with the third portion 330a in a state where the second portion 320b sandwiches elements 510 cooperatively with a first portion 310.

With such a configuration, the energy storage device 10e according to this modification can acquire substantially the same advantageous effects as the above-mentioned embodiment. Particularly, according to this modification, the second portion 320b is disposed in a state where the second portion 320b is brought into contact with the distal end portion of the third portion 330a and hence, the second portion 320b can be fixed in a stable manner.

(Seventh Modification)

Next, a seventh modification of the above-mentioned embodiment is described. In the above-mentioned embodiment, the terminal portion 300 is disposed so as to cover the periphery of the body portion 200. However, in this modification, a body portion is disposed so as to cover the periphery of the terminal portion.

Figure 14:
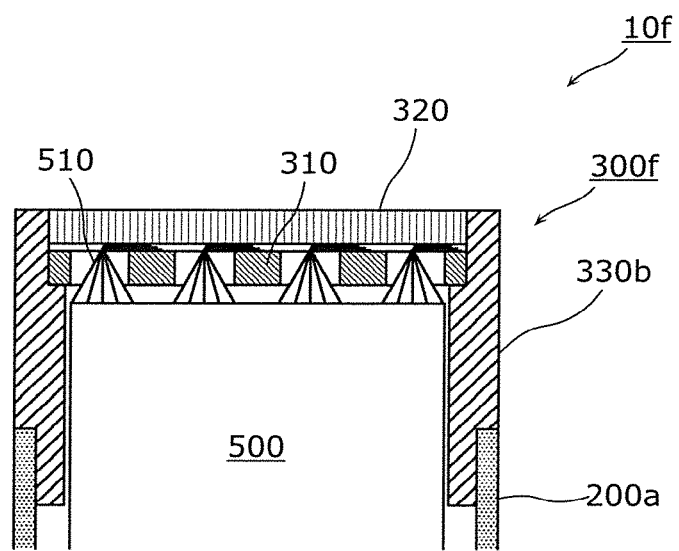
FIG. 14 is a cross-sectional view showing a configuration of an energy storage device according to a seventh modification of the embodiment of the present invention.
Figure 14:
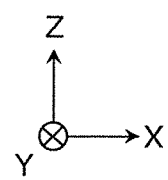

FIG. 14 is a cross-sectional view showing the configuration of an energy storage device 10f according to the seventh modification of the embodiment of the present invention. To be more specific, FIG. 14 is a view showing the configuration of the energy storage device 10f which corresponds to the configuration of the energy storage device 10 on a terminal portion 300 side shown in FIG. 2.

As shown in FIG. 14, the energy storage device 10f of this modification includes a body portion 200a and a terminal portion 300f in place of the body portion 200 and the terminal portion 300 which the energy storage device 10 of the above-mentioned embodiment includes. The terminal portion 300f includes a third portion 330b in place of the third portion 330 which the terminal portion 300 of the above-mentioned embodiment includes. Other configurations of the energy storage device 10f are substantially equal to corresponding configurations of the energy storage device 10 of the above-mentioned embodiment and hence, the detailed description of other configurations is omitted.

The third portion 330b includes a stair-like step on an end portion thereof on a body portion 200a side (a minus side in the Z axis direction), and the body portion 200a is disposed on the step. That is, the body portion 200a is disposed so as to cover the periphery of the stepped portion which is formed on an outer periphery of a lower end portion of the third portion 330b. In this case, to provide insulation between the conductive third portion 330b and the electrode assembly 500, an insulating portion such as an insulating sheet is disposed between the third portion 330b and the electrode assembly 500.

With such a configuration, the energy storage device 10f according to this modification can acquire substantially the same advantageous effects as the above-mentioned embodiment. Particularly, according to this modification, it is sufficient to wrap the body portion 200a around the periphery of the third portion 330b and hence, the degree of freedom in manufacturing the energy storage device 10f can be increased. Further, by arranging the body portion 200a on the stepped portion formed on the outer periphery of the third portion 330b, the body portion 200a does not project outward and hence, it is possible to prevent the body portion 200a from becoming an obstacle in connecting the third portion 330b and a third portion of another energy storage device to each other and the like.

The configuration may be adopted where the stepped portion is not formed on the outer periphery of the lower end portion of the third portion 330b and the body portion 220a is arranged so as to cover the outer periphery of the lower end portion of the third portion 330b.

(Eighth Modification)

Next, an eighth modification of the above-mentioned embodiment is described. In the above-mentioned embodiment, the opening portions 311 are formed in the first portion 310. However, in this modification, opening portions are not formed in a first portion.

Figure 15:
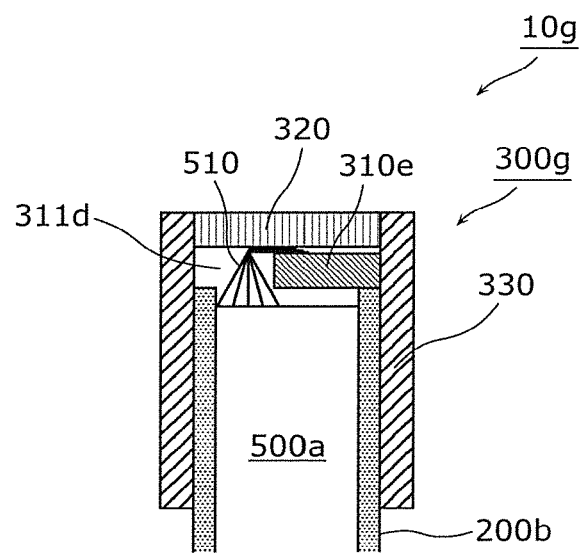
FIG. 15 is a cross-sectional view showing a configuration of an energy storage device according to an eighth modification of the embodiment of the present invention.

FIG. 15 is a cross-sectional view showing the configuration of an energy storage device 10g according to the eighth modification of the embodiment of the present invention. To be more specific, FIG. 15 is a view showing the configuration of the energy storage device 10g which corresponds to the configuration of the energy storage device 10 on a terminal portion 300 side shown in FIG. 2.

As shown in FIG. 15, the energy storage device 10g of this modification includes a body portion 200b, a terminal portion 300g and an electrode assembly 500a in place of the body portion 200, the terminal portion 300 and the electrode assembly 500 which the energy storage device 10 of the above-mentioned embodiment includes. Further, the terminal portion 300g includes a first portion 310e in place of the first portion 310 which the terminal portion 300 in the above-mentioned embodiment includes. Other configurations of the energy storage device 10g are substantially equal to corresponding configurations of the energy storage device 10 of the above-mentioned embodiment and hence, the detailed description of other configurations is omitted.

The first portion 310e is formed of a flat-plate-shaped member in which opening portions (through holes) are not formed. The first portion 310e is disposed such that a gap 311d is formed between the first portion 310e and an inner surface of the body portion 200b. Further, the electrode assembly 500a includes one element 510, and the element 510 is disposed in a state where the element 510 is inserted into the gap 311d.

With such a configuration, the energy storage device 10g according to this modification can acquire substantially the same advantageous effect as the above-mentioned embodiment. Particularly, according to this modification, the energy storage device 10g can be easily formed without forming opening portions (through holes) in the first portion 310e.

(Ninth Modification)

Next, a ninth modification of the above-mentioned embodiment is described. In this modification, a safety valve is formed on a second portion.

Figure 16A:
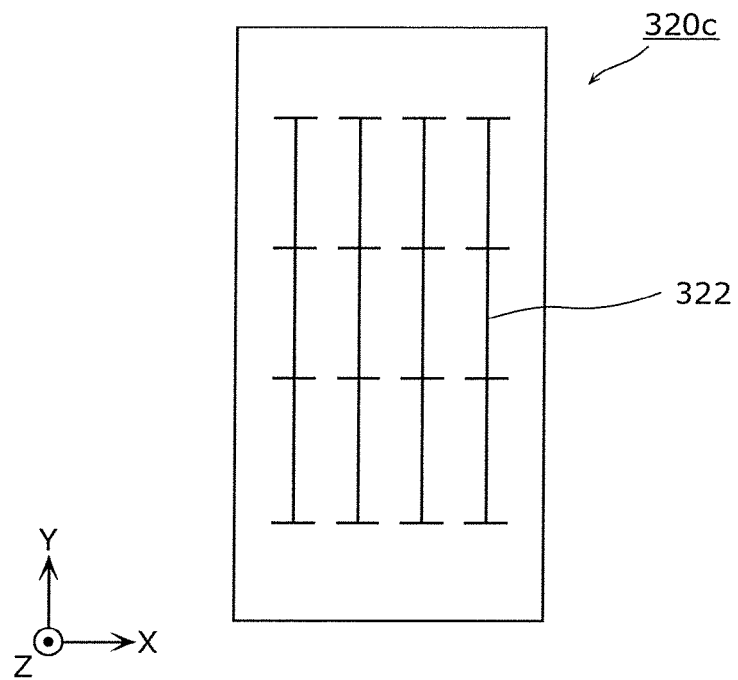
FIG. 16A is a plan view showing a configuration of a second portion according to a ninth modification of the embodiment of the present invention.
Figure 16B:
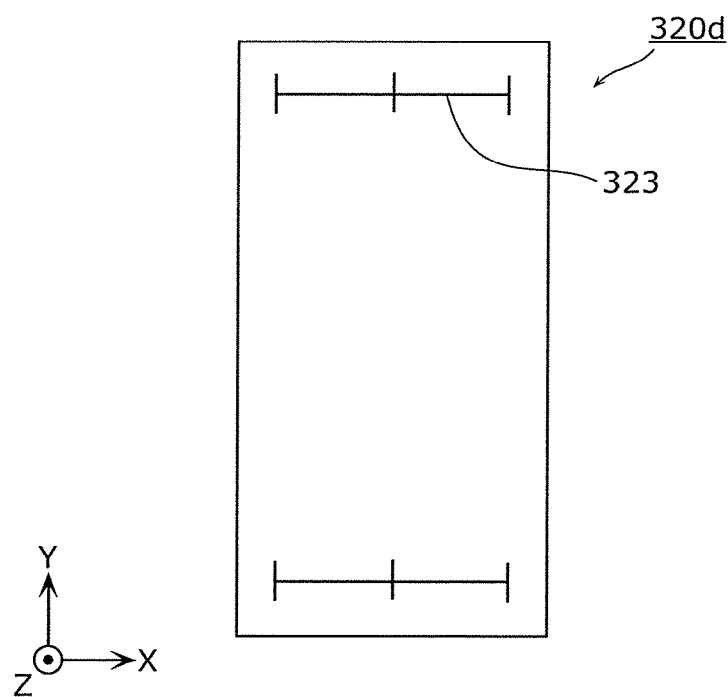
FIG. 16B is a plan view showing a configuration of the second portion according to the ninth modification of the embodiment of the present invention.

FIG. 16A and FIG. 16B are plan views showing configurations of second portions 320c, 320d according to the modification 9 of the embodiment of the present invention respectively. To be more specific, FIG. 16A is a plan view showing the configuration of the second portion 320c when the second portion 320c is as viewed from above (a plus side in the Z axis direction), and FIG. 16B is a view showing the configuration of the second portion 320d as viewed from above (a plus side in the Z axis direction).

As shown in FIG. 16A, groove portions 322 each of which functions as a safety valve are formed on approximately the whole upper surface (a surface on a plus side in the Z axis direction) of the second portion 320c. That is, a plate thickness of the second portion 320c is reduced at portions where the groove portions 322 are formed. Accordingly, when a pressure in a container 100 is increased, the portions where the groove portions 322 are formed are opened so that the pressure is released. Other configurations of this modification are substantially equal to corresponding configurations of the above-mentioned embodiment and hence, the detailed description of other configurations is omitted.

The groove portion which forms the safety valve may be formed at any position on the second portion. For example, as shown in FIG. 16B, a groove portion 323 which functions as a safety valve is formed on end portions (end portions on both sides in the Y axis direction) of an upper surface (a surface on a plus side in the Z axis direction) of the second portion 320d. That is, elements 510 of an electrode assembly 500 are not formed directly below the groove portions 323 and hence, when a pressure in the container 100 is increased, portions where the groove portions 323 are formed can be effectively opened.

Further, when a solution filling port for filling an electrolyte solution is formed in the second portion, in the same manner as the groove portions 323, it is preferable that the solution filling port be formed in the above-mentioned end portions (end portions on both sides in the Y axis direction) of the second portion for effectively filling the electrolyte solution. The solution filling port may be disposed on a body portion.

Although the energy storage devices according to the embodiment of the present invention and the modifications of the embodiment have been described heretofore, the present invention is not limited to the embodiment and the modifications of the embodiment. That is, it should be construed that the embodiment and the modifications of the embodiment disclosed in this specification merely show examples in all respects and are not limitative. The scope of the present invention is not defined by the description of the embodiment and the modifications of the embodiment but is defined by "What is claimed is" and intends to embrace all changes which fall within the meaning and the scope equivalent to the meaning and the scope of "What is claimed is".

For example, in the embodiment and the modifications of the embodiment, the body portion of the container 100 is formed of an insulating member. However, it is unnecessary that the whole body portion is formed of an insulating member, and the body portion may include a conductive member provided that the body portion can provided insulation between two terminal portions which differ from each other. As such a body portion, a body portion is considered where a resin or the like is applied to a conductive member metal or the like by coating. To be more specific, for example, the body portion may be formed of a pouch (laminate) having the multi-layered structure where a metal layer made of aluminum or the like is sandwiched by resin layers made of PE, PP or the like. In this case, for example, as shown in FIG. 14, by adopting the configuration where the body portion covers the terminal portions, the energy storage device can be easily manufactured. When a pouch (laminate) is used for forming the body portion, the pouch may be formed of a single sheet or may be formed of a plurality of sheets. By forming the body portion using a pouch formed of a single sheet, compared to the case where the body portion is formed using a pouch formed of a plurality of sheets, the number of joining portions can be reduced in joining the pouches (for example, by thermal welding) for forming the body portion. In a joining portion of pouches, the pouches are at least doubled and hence, a thickness of the joining portion becomes larger than thicknesses of portions other than the joining portion. However, by reducing the number of joining portions, the number of large thickness portions can be reduced and hence, such a configuration is advantageous for miniaturization of the energy storage device.

In the above-mentioned embodiment, the body portion 200 and the terminal portions 300, 400 are insulated from each other. However, the body portion 200 may be electrically conductive with the terminal portion 300 or the terminal portion 400. That is, for example, the body portion 200 may be configured such that the body portion 200 is electrically conductive with the terminal portion 300 and is electrically insulated from the terminal portion 400. Alternatively, the body portion 200 may be configured such that the body portion 200 is electrically insulated from the terminal portion 300 and is electrically conductive with the terminal portion 400. To provide insulation between the body portion and the terminal portion, for example, an electrically insulating adhesive material layer may be provided between the body portion and the terminal portion. In this case, to surely provide insulation between the body portion and the terminal portion, an electrically insulating adhesive material layer is formed at least on a surface of the body portion which is brought into contact with the terminal portion. The same goes also for the above-mentioned respective modifications.

Further, an insulating member which electrically insulates the electrode assembly and the body portion from each other may be provided between the electrode assembly and the body portion. As the insulating member, an insulating film can be named, for example. To be more specific, for example, the electrode assembly may be wrapped by an insulating film. Further, an insulating film may be adhered to a surface of the body portion which is brought into contact with the electrode assembly. Although a material for forming an insulating film is not particularly limited, an insulating resin such as polypropylene can be used, for example. The insulating member may be formed of a resin member having rigidity. For example, it is possible to provide insulation between the electrode assembly and the body portion also by arranging a resin member (a resin molded body) having rigidity between the electrode assembly and the body portion. The resin member having rigidity can be also used as a guide in inserting the electrode assembly into the body portion. For example, the electrode assembly is sandwiched by the resin member having rigidity and, thereafter, the electrode assembly is inserted into the body portion. With the use of the resin member having rigidity, the electrode assembly can be protected and hence, it is possible to effectively prevent the electrode assembly from being damaged.

The body portion may be formed of two or more members. For example, the body portion may be formed of two members. In this case, by arranging the electrode assembly between two members which form the body portion and, thereafter, by joining end portions of two members to each other, the electrode assembly can be accommodated in the body portion. Accordingly, it is unnecessary to provide a step of inserting the electrode assembly into the body portion.

The body portion and the third portion may be formed integrally with each other. To be more specific, the body portion made of metal and the third portion made of metal may be formed integrally with each other by insert molding where a resin is filled between the body portion and the third portion by molding. Due to insert molding of the resin, the body portion and the third portion can be joined to each other and can be insulated from each other.

In the above-mentioned embodiment, sizes of the body portion 200 and the terminal portions 300, 400 are not particularly limited. For example, the body portion 200 may be set relatively small compared to the terminal portions 300, 400. With such a configuration, when the energy storage devices have the same shape, the terminal portions 300, 400 can be made relatively large and hence, a contact area between the terminal portions 300 of the energy storage devices arranged adjacently to each other and a contact area between the terminal portions 400 of the energy storage devices arranged adjacently to each other can be increased. As a reverse case, a size of the body portion 200 may be set large relative to the terminal portions 300, 400. With such a configuration, for example, by using a relatively lightweight raw material such as a resin for forming the body portion, the reduction of weight of the energy storage device and the reduction of weight of the energy storage apparatus can be realized. The same goes also for the above-mentioned respective modifications. Further, in the above-mentioned embodiment and the modifications of the embodiment, the non-coated portions of the positive electrodes and the non-coated portions of the negative electrodes respectively project in directions opposite to each other (for example, a plus side and a minus side in the Z axis direction). However, for example, the non-coated portions of the positive electrodes and the non-coated portions of the negative electrodes may project in directions orthogonal to each other. To be more specific, for example, the non-coated portions of the positive electrodes may project toward a plus side in the Z axis direction and the non-coated portions of the negative electrodes may project toward a plus side in the Y axis direction.

In the above-mentioned embodiment and the modifications of the embodiment, on the first portion, the first edge portions and the columnar portion are formed in an extending manner in the longitudinal direction (Y axis direction) of the first portion, and the second edge portions are formed in an extending manner in the lateral direction (X axis direction) of the first portion. However, on the first portion, the first edge portions and the columnar portions may be formed in an extending manner in the lateral direction (X axis direction) of the first portion, and the second edge portions may be formed in an extending manner in the longitudinal direction (Y axis direction) of the first portion. In this case, it is possible to suppress the deflection of the first edge portions and the columnar portions thus maintaining uniform welding quality of the first portions and the second portions.

Further, in the above-mentioned embodiment and the modifications of the embodiment, a positioning (space retaining) member for maintaining a distance between the electrode assembly and the first portion and/or the second portion may be arranged between the electrode assembly and the first portion and/or the second portion. In this case, it is possible to suppress a phenomenon where the first portion and/or the second portion are brought into contact with the electrode assembly so that the electrode assembly is damaged. Particularly, when the body portion is formed of a flexible member such as a pouch, such a configuration can acquire such advantageous effects at a high level. Further, the electrode assembly may be sandwiched by the member which forms the body portion so as to apply a pressure (surface pressure) to the electrode assembly thus preventing the electrode assembly from being inflated. Further, configurations which are formed by desirably combining constitutional elements included in the above-mentioned embodiment and the modifications of the embodiment are also included in the scope of the present invention.

The present invention can be realized not only as such an energy storage device but also as a terminal portion which the energy storage device includes or a first portion which the terminal portion includes.

INDUSTRIAL APPLICABILITY

The present invention is applicable to an energy storage device or the like where plates of an electrode assembly can be easily fixed to a container.

DESCRIPTION OF REFERENCE SIGNS 1, 2, 3 energy storage apparatus 10, 10a, 10b, 10c, 10d, 10e, 10f, 10g energy storage device 100 container
110 welded portion
200, 200a, 200b body portion
300, 300a, 300b, 300c, 300d, 300e, 300f, 300g, 400 terminal portion
310, 310a, 310b, 310c, 310d, 310e, 410 first portion
311, 311a, 311b, 311c opening portion
311d gap
312 first edge portion
313 second edge portion
314, 314a, 314b columnar portion
315 column distal end portion
320, 320a, 320b, 320c, 320d, 420 second portion
321 recessed portion
322, 323 groove portion
330, 330a, 330b, 430 third portion
500, 500a electrode assembly
510, 520 element
511, 512 plate

The invention claimed is:

1. An energy storage device comprising:
an electrode assembly formed of stacked plates; and
a container which accommodates the electrode assembly, wherein the container includes:
a body portion having an open end; and
a conductive terminal portion connected to the body portion, wherein the terminal portion includes a first portion and a second portion which sandwich end portions of the stacked plates therebetween, and wherein the conductive terminal portion closes the open end.

2. The energy storage device according to claim 1, wherein the electrode assembly includes an element formed by stacking a plurality of plates, the first portion has an opening portion corresponding to the element, and the second portion is configured to sandwich the element inserted through the opening portion cooperatively with the first portion.

3. The energy storage device according to claim 2, wherein the electrode assembly includes a plurality of elements, the first portion has a plurality of opening portions corresponding to the plurality of elements, and the second portion is configured to sandwich the plurality of elements inserted through the plurality of opening portions cooperatively with the first portion.

4. The energy storage device according to claim 2, wherein the opening portion is formed by opening a part of a periphery of the first portion.

5. The energy storage device according to claim 4, wherein the first portion has a comb shape.

6. The energy storage device according to claim 2, wherein a width of the opening portion is increased gradually in a direction toward an inside of the container.

7. The energy storage device according to claim 1, wherein the terminal portion includes a welded portion where the first portion, the second portion and the plates are welded to each other.

8. The energy storage device according to claim 1, wherein the first portion has an insulating portion on an inner side of the container.

9. The energy storage device according to claim 8, wherein width of the insulating portion is narrowed gradually in a direction toward an inside of the container.

10. The energy storage device according to claim 1, wherein the first portion includes an opening in which the stacked plates are inserted.

11. The energy storage device according to claim 10, wherein the stacked plates are bent onto a solid portion of the first portion adjacent the opening.

12. The energy storage device according to claim 11, wherein the second portion is clamped down on the stacked plates.

13. The energy storage device according to claim 1, wherein the first portion is sandwiched between the second portion and the body portion.

14. The energy storage device according to claim 1, wherein the stacked plates include main portions housed by the body portion of the container, wherein the end portions extend from the main portions, and wherein at least parts of the end portions are substantially perpendicular to the main portions.

15. The energy storage device according to claim 1, wherein each of the stacked plates includes a foil and an active material applied to the foil.

16. The energy storage device according to claim 15, wherein each foil has a thickness between 5 μm to 20 μm.

* * * * *